United States Patent
Shimazu

(10) Patent No.: US 6,776,809 B2
(45) Date of Patent: Aug. 17, 2004

(54) FUEL REFORMING APPARATUS

(75) Inventor: Takashi Shimazu, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 634 days.

(21) Appl. No.: 09/860,480

(22) Filed: May 21, 2001

(65) Prior Publication Data

US 2001/0049906 A1 Dec. 13, 2001

(30) Foreign Application Priority Data

| Jun. 8, 2000 | (JP) | ......................................... 2000-172373 |
| Jun. 28, 2000 | (JP) | ......................................... 2000-193715 |
| Apr. 10, 2001 | (JP) | ......................................... 2001-111250 |

(51) Int. Cl.[7] ............................................... G01B 3/38
(52) U.S. Cl. ........................................... 48/76; 48/127.9
(58) Field of Search .......................... 48/61, 62 R, 76, 48/127.9, 128, 198.3, 198.7, 214 R, 214 A, 215; 422/188, 189, 190, 198, 211, 222

(56) References Cited

U.S. PATENT DOCUMENTS 5,324,452 A * 6/1994 Allam et al. ................. 252/373
6,521,143 B1 * 2/2003 Genkin et al. ............... 252/373

FOREIGN PATENT DOCUMENTS

| DE | 199 02 926 A1 | 8/2000 |
| EP | 0 985 635 A1 | 3/2000 |
| JP | A 63-303801 | 12/1988 |
| JP | A 8-301601 | 11/1996 |

* cited by examiner

Primary Examiner—Samuel M. Heinrich
(74) Attorney, Agent, or Firm—Oliff & Berridge, PLC

(57) ABSTRACT

A heat exchanger 32 comprises a first heat exchanger 40 for allowing heat to be exchanged between water and a reformed gas from a reforming reactor, a second heat exchanger 50 for spraying and vaporizing water in the reformed gas from the first heat exchanger 40, and a third heat exchanger 60 for vaporizing unvaporized or precipitated water. The reformed gas from the reforming reactor is cooled by the heating and vaporizing of water, and is mixed with the vaporized water and fed as mixed gas to a water gas shift reactor. The processes of cooling the reformed gas, heating and vaporizing of the water, and mixing the reformed gas and steam are completed in the heat exchanger 32, making it possible to design a smaller, simpler, and more efficient apparatus.

67 Claims, 21 Drawing Sheets

REFORMED GAS → → MIXED GAS

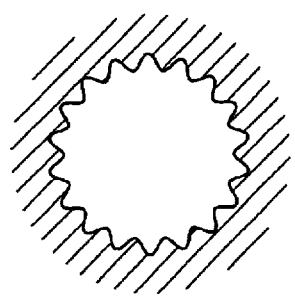 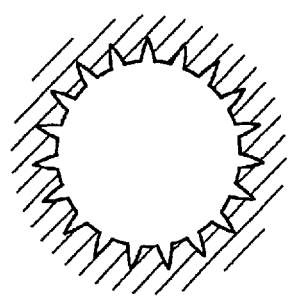 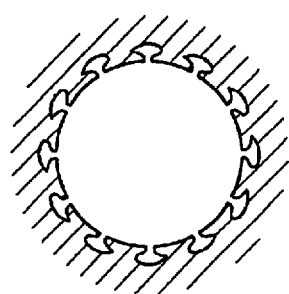
Fig.36(a)  Fig.36(b)  Fig.36(c)
Fig.37
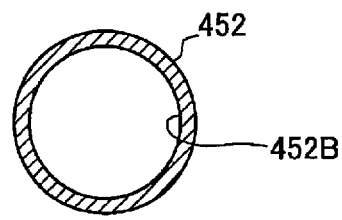

FUEL REFORMING APPARATUS

BACKGROUND OF THE INVENTION

1. Field of the Invention

The present invention relates to a fuel reforming apparatus for reforming hydrocarbon-based fuel into hydrogen-rich fuel gas.

2. Description of the Related Art

In conventional fuel reforming apparatus, for example, those in JP-A-63-303801, steam is admixed into a reformed gas containing hydrogen and carbon monoxide, and the carbon monoxide in the reformed gas is converted to hydrogen and carbon dioxide by means of steam, yielding hydrogen-rich gas. Such apparatus are provided with a water-vaporizing evaporator, and the steam produced by the evaporator is admixed into the reformed gas.

The need for vaporizers makes such fuel reforming apparatus complicated and bulky. In addition, a water-vaporizing heat source is needed, and the reformed gas must be efficiently cooled before being introduced into the water gas shift reactor. These factors often reduce the thermal efficiency of the apparatus. Furthermore, conventional heat exchangers, such as those involving water, oil, or air cooling, are impaired in their ability to respond to transient variations in temperature or heat due to the heat capacity of the coolant and constituent elements used.

SUMMARY OF THE INVENTION

Accordingly, an object of the present invention is to provide a smaller, simpler, and more responsive reforming apparatus. Another object of the present invention is to render heat exchange more efficient by utilizing the latent heat generated when water is introduced into a reformed gas and vaporized, and to mix the reformed gas and vaporized steam with greater uniformity. Yet another object of the present invention is to increase the thermal efficiency of the reforming apparatus.

In order to attain at least part of the above and other related objects of the present invention, there is provided a fuel reforming apparatus for reforming hydrocarbon-based fuel into hydrogen-rich fuel gas. The fuel reforming apparatus comprises: a reforming reactor for reforming the hydrocarbon-based fuel into a reformed gas containing hydrogen and carbon monoxide; a water gas shift reactor for shifting the carbon monoxide to carbon dioxide using steam, thereby producing the carbon dioxide and hydrogen; and a water feeding/mixing unit for spraying the reformed gas with water, vaporizing the sprayed water, forming a mixture with the reformed gas, and feeding the mixed gas to the water gas shift reactor.

In the above apparatus, the water is vaporized at least partially by the sensible heat of the reformed gas because the reformed gas is directly sprayed with water. In addition, the optimal temperature of the water gas shift reactor is commonly lower than the optimal temperature of the reforming reactor, so the temperature of the mixed gas fed to the water gas shift reactor can be reduced by absorbing latent heat by the spraying and vaporization of water.

According to an aspect of the present invention, a fuel reforming apparatus comprises: a reforming reactor for generating a reformed gas containing hydrogen and carbon monoxide from the hydrocarbon-based fuel; a water gas shift reactor for reducing concentration of carbon monoxide in the reformed gas by promoting a shift reaction for generating hydrogen and carbon dioxide from carbon monoxide and steam; a water feeding unit for feeding water for use in the shift reaction into a flow path of the reformed gas; and a heat exchanger for cooling the reformed gas prior to completion of the shift reaction by exchanging heat with a coolant including water to be used in the shift reaction. The water feeding unit vaporizes the water to be used in the shift reaction that has been heated in the heat exchanger, thereby feeding the water into the flow path of the reformed gas.

In the above arrangement, the water to be used in the shift reaction that is fed to the reformed gas flow path is heated by the heat exchanger, making it possible to reduce the energy expended on vaporizing the water to be used in the shift reaction and to simplify the structure used to vaporize the water. In addition, the heat exchanger simultaneously acts to cool the reformed gas, making it possible to simplify the structure to cool the reformed gas. The entire fuel reforming apparatus can therefore be made more energy efficient.

According to another aspect of the present invention, a fuel reforming apparatus comprises: a reforming reactor for reforming the hydrocarbon-based fuel into a reformed gas containing hydrogen and carbon monoxide; a water gas shift reactor for converting steam and carbon monoxide into hydrogen and carbon dioxide; a connector for connecting the reforming reactor and the water gas shift reactor to allow the reformed gas from the reforming reactor to be fed to the water gas shift reactor, the connector including a reformed gas permeable member disposed proximate to the reforming reactor, the reformed gas permeable member having a plurality of gaps capable of passing the reformed gas from the reforming reactor; and a liquid water feeding unit for feeding liquid water to the reformed gas permeable member.

In the above arrangement, the liquid water cools the reformed gas and vaporizes by exchanging heat with the reformed gas, and is then fed to the water gas shift reactor after being mixed with the reformed gas. Supplying liquid water in an amount needed for shift reactions makes it possible to feed the steam needed for the shift reactions and to cool the reformed gas. In addition, spraying, vaporizing, and mixing liquid water in the reformed gas permeable member ensure that the heat-transfer surface is efficiently used and that the steam is uniformly admixed into the reformed gas.

According to still another aspect of the present invention, the reformed gas permeable member have a plurality of capillaries. This arrangement also makes it possible to feed the steam needed for the shift reactions and to cool the reformed gas.

These and other objects, features, aspects, and advantages of the present invention will become more apparent from the following detailed description of the preferred embodiments with the accompanying drawings.

BRIEF DESCRIPTION OF THE DRAWINGS

FIGS. 36(a)–36(c) show examples of surfaces inside the capillaries 452;

FIG. 37 is a diagram showing an example of surface inside the capillaries 452.

DESCRIPTION OF THE PREFERRED EMBODIMENT

A. First Embodiment

Figure 1:
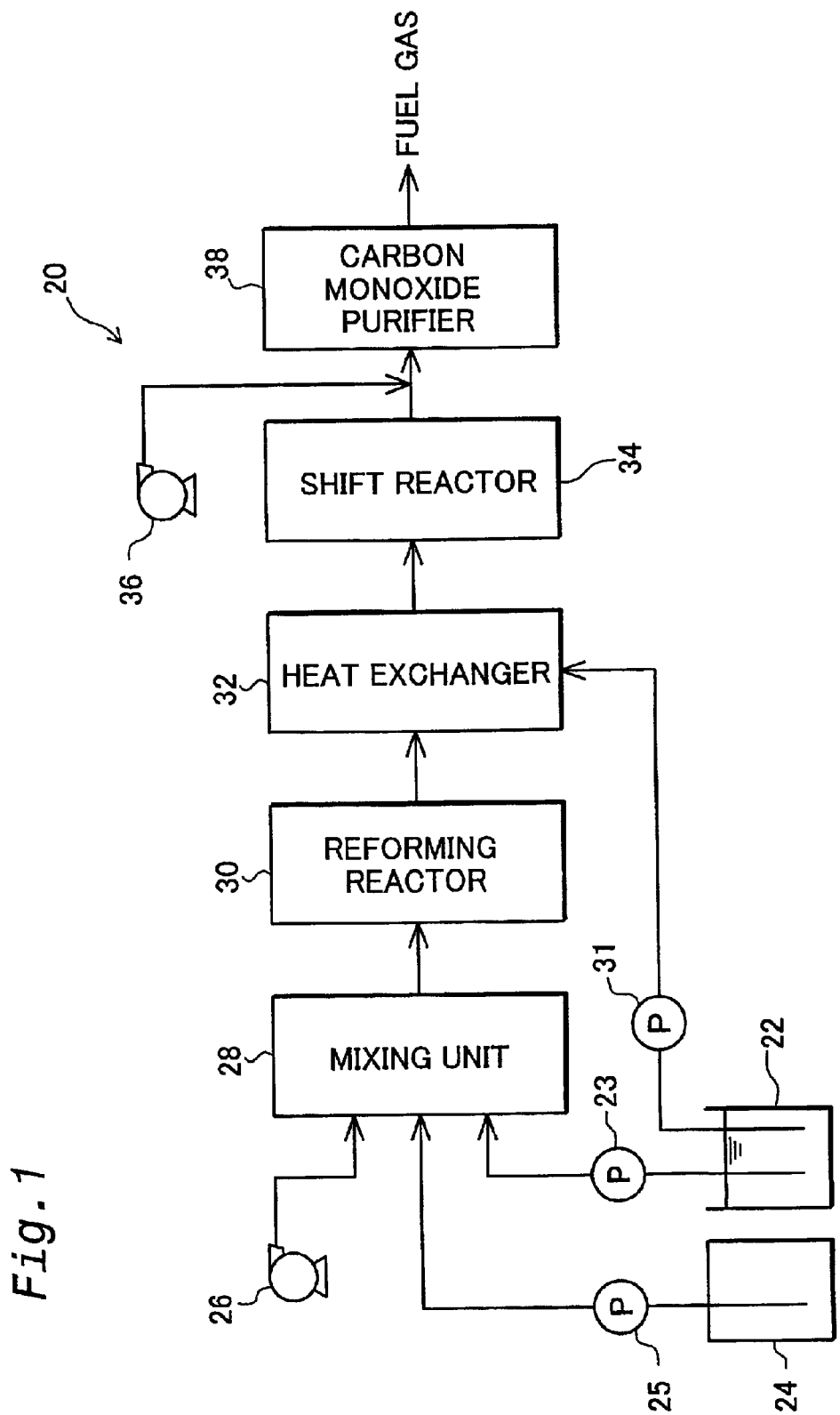
FIG. 1 is a block diagram of a fuel reforming apparatus 20, which constitutes a first embodiment of the present invention.

FIG. 1 is a block diagram outlining in schematic form the structure of a fuel reforming apparatus 20, which constitutes a first embodiment of the present invention. The fuel reforming apparatus 20 comprises a mixing unit 28 for mixing air (supplied by a blower 26), water (fed from a water tank 22 by a water pump 23), and a hydrocarbon-based fuel such as propane or butane (fed from a fuel tank 24 by a fuel pump 25) to obtain a reforming stock; a reforming reactor 30 for reforming the reforming stock into a reformed gas containing hydrogen and carbon monoxide; a heat exchanger 32 for mixing the reformed gas with the water fed from the water tank 22 by a water pump 31 to obtain a mixed gas including steam and reformed gas while cooling the mixed gas to a temperature within a prescribed range; a water gas shift reactor 34 for converting the carbon monoxide in the mixed gas into hydrogen and carbon dioxide by a shift reaction; and a carbon monoxide purifier 38 for oxidizing the carbon monoxide that has not been converted in the water gas shift reactor 34 with the oxygen in the air fed by a blower 36, yielding a fuel gas rich in hydrogen and low in carbon monoxide. Since the heat exchanger 32 has the main features of the present invention, the rest of the structure will be omitted from the detailed description. In the heat exchanger 32 of the fuel reforming apparatus 20 pertaining to the first embodiment, steam is admixed into the reformed gas from the reforming reactor 30 operating at about 600–1000° C., and the gas is cooled to about 200–600° C. in order to be fed to the water gas shift reactor 34, which is operated at about 200–600° C.

Figure 2:
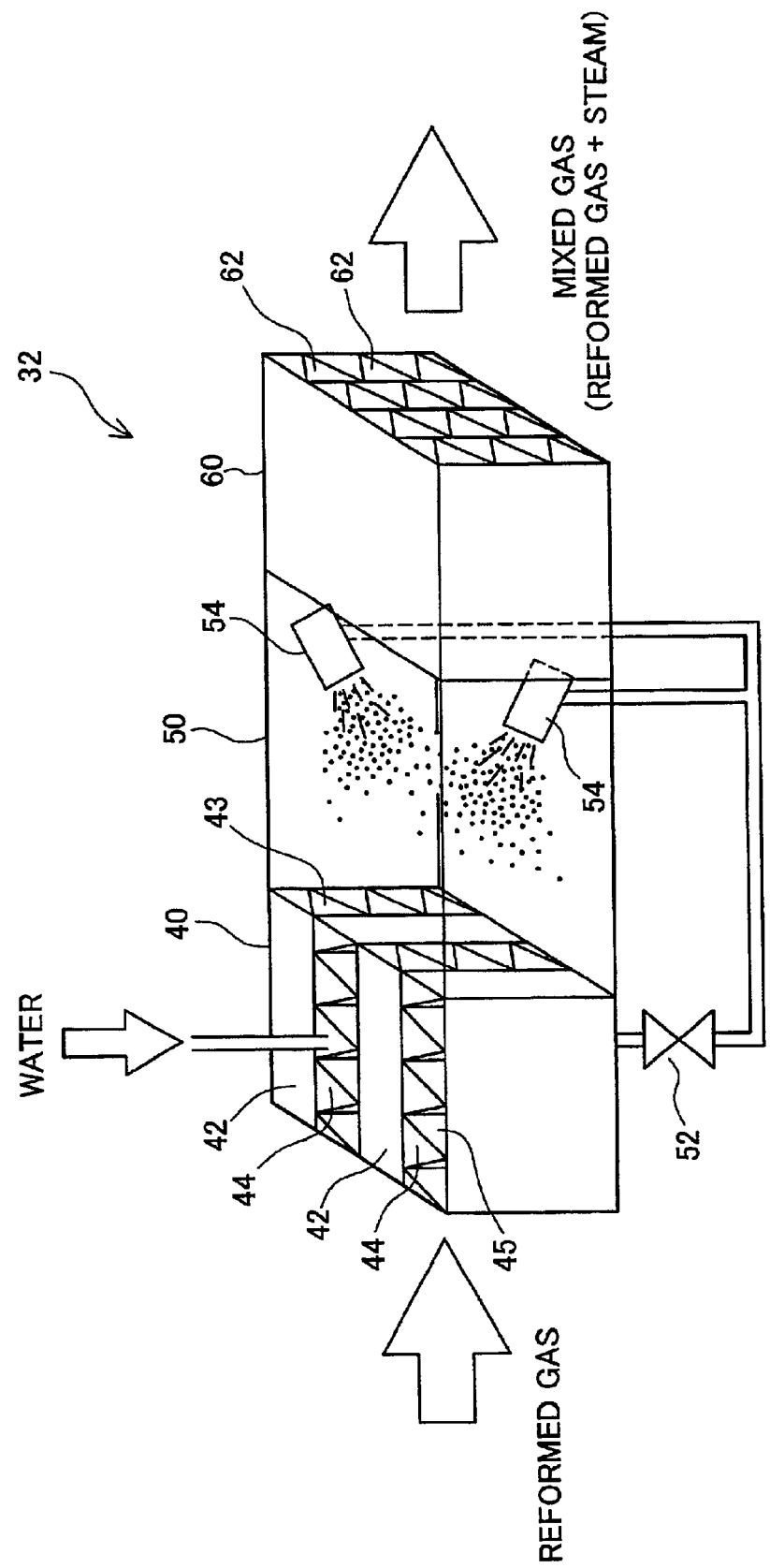
FIG. 2 schematically illustrates the structure of s heat exchanger 32.

FIG. 2 is a block diagram outlining the structure of the heat exchanger 32. The heat exchanger 32 comprises a first heat exchanger 40 for heating water-to-be-sprayed with reformed gas, a second heat exchanger 50 for atomizing water over the reformed gas, and a third heat exchanger 60 for vaporizing the water.

The first heat exchanger 40 includes a stack of a plurality of gas channel members 42 for conducting reformed gas from left to right in the drawing, and a plurality of water channel members 44 for conducting water from top to bottom in the drawing. The water is heated while the reformed gas is cooled by the exchange of heat between the reformed gas from the reforming reactor 30 and the water fed from the water tank 22. The water pressure is adjusted to a desired pressure by a pressure regulating valve 52. The gas channel members 42 and water channel members 44 are provided with a plurality of fins 43 and 45 for improving heat exchange efficiency. The heating of water in the first heat exchanger 40 is adjusted such that saturated liquid water in pressurized state is provided by the pressure regulating valve 52.

The second heat exchanger 50 includes two nozzles 54 for spraying the water supplied by the pressure regulating valve 52 at a prescribed angle against the flow of reformed gas downwardly. The atomized water absorbs heat from the reformed gas, vaporizes to form steam, and mixes with the reformed gas to form mixed gas. The reformed gas is therefore further cooled by the latent heat required for water vaporization. In this case, water is sprayed at a prescribed angle against the flow of reformed gas in order to facilitate the vaporization of atomized water and the mixing of the water with the reformed gas. The water is sprayed downwardly over the reformed gas in order to ensure that the temperature of the reformed gas flowing at the bottom is higher than that of the reformed gas flowing at the upper space. This arrangement facilitates to re-vaporize water accumulated on the bottom of the second heat exchanger 50 even when the water vapor precipitates at the bottom. The water is also fed in the first heat exchanger 40 downwardly in order to ensure that the temperature of the reformed gas flowing at a relatively lower flow path is higher than that of the reformed gas flowing at a relatively higher path.

The third heat exchanger 60 includes a plurality of mixed gas channels 62 in the form of honeycomb tubes. In the mixed gas channels 62, the unvaporized or precipitated water on the wall surface is vaporized by the mixed gas.

With the heat exchanger 32 of the fuel reforming apparatus 20, the steam for use in the reaction in the water gas shift reactor 34 is admixed into the reformed gas while the mixed gas is cooled down to within a temperature range suitable for the shift reaction. In addition, the three heat exchangers 40, 50, and 60 gradually cool the reformed gas while vaporizing water, making it possible to cool the mixed gas in a more sustained manner. The heat exchanger 32 of the fuel reforming apparatus 20 also reduces heat loss and enhances heat exchange efficiency by vaporizing water in the same area in which the reformed gas is cooled. Another feature of the heat exchanger 32 is that because water is heated in the first heat exchanger 40 and is sprayed and vaporized in the second heat exchanger 50, there is no need to provide a separate evaporator or line, making it possible to simplify the apparatus, to reduce its size, and to achieve higher heat efficiency.

B. Modification of First Embodiment

Figure 3:
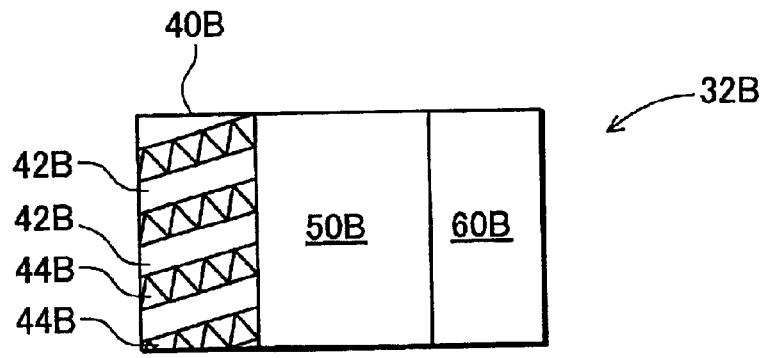
FIG. 3 shows the heat exchanger 32B of a first modified example.
Figure 4:
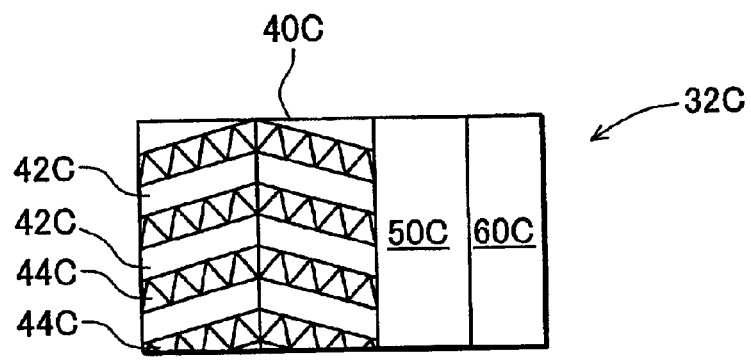
FIG. 4 shows the heat exchanger 32C of a second modified example.
Figure 5:
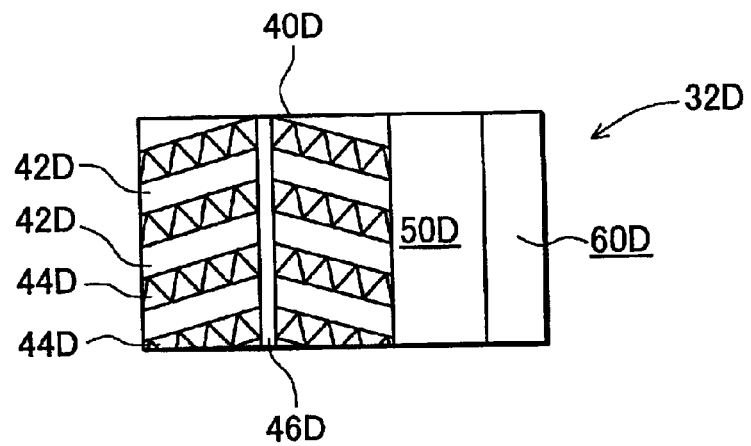
FIG. 5 shows the heat exchanger 32D of a third modified example.
Figure 6:
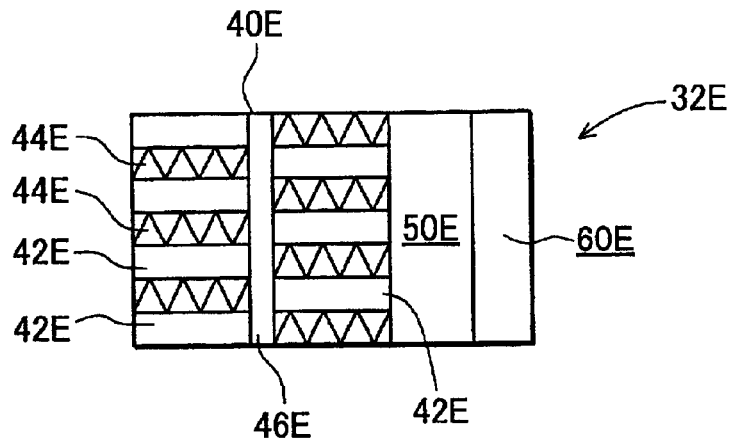
FIG. 6 shows the heat exchanger 32E of a fourth modified example.
Figure 7:
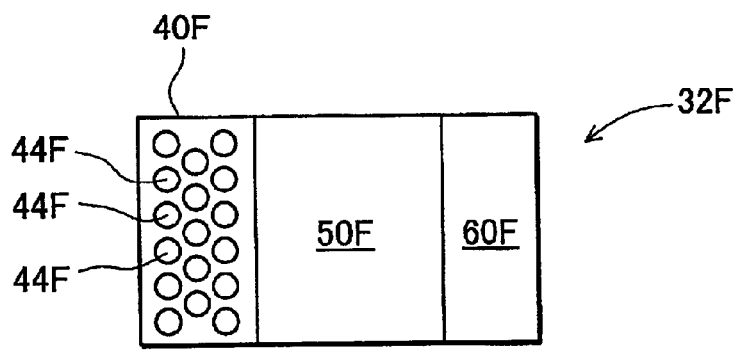
FIG. 7 shows the heat exchanger 32F of a fifth modified example.

The heat exchanger 32 in the first embodiment can be modified in various forms as follows. FIG. 3 shows a first modification 32B in which the gas channel members 42B of the first heat exchanger 40B are configured to form a reformed gas flow at a prescribed angle to the overall flow direction of reformed gas. As a result, the water sprayed from the nozzles 54 (FIG. 2) can be prevented to flow back upstream, and higher heat exchange efficiency can be achieved. Unvaporized or precipitated water on the wall can also be vaporized by the reformed gas. FIG. 4 shows a second modification 32C in which the gas channel members 42C are cranked at the middle in order to prevent the atomized waters to flow back upstream, thereby enhancing heat exchange efficiency and vaporizing unvaporized or precipitated water. FIG. 5 shows a third modification 32D in which the cranked portion of the gas channel members 42D is provided with a space 46D. FIG. 6 shows a fourth modification 32E in which the first heat exchanger 40E is divided into first and second halves, a space 46E is provided between the first and second stages, and the gas channel members 42E of the first and second stages are mutually misaligned. This structure prevents the reformed gas from flowing in a straight line, and inhibits the backflow of atomized water, to thereby achieve higher heat exchange efficiency, and vaporization of unvaporized or precipitated water. FIG. 7 shows a fifth modification 32F in which the water channel members 44F are constructed to be tubes arranged in a staggered manner. This structure also prevents the reformed gas from flowing in a straight line.

Figure 8:
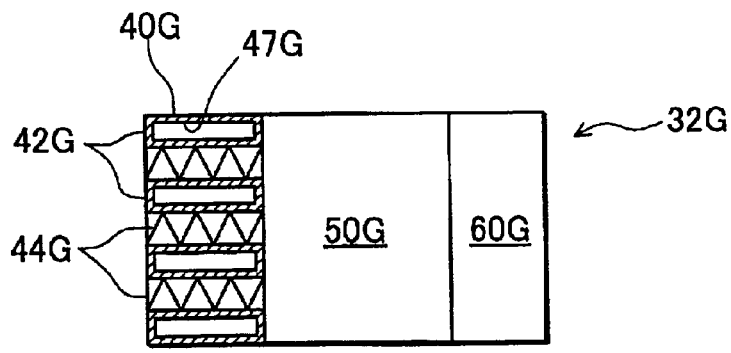
FIG. 8 shows the heat exchanger 32G of a sixth modified example.

FIG. 8 shows a sixth modification 32G in which the surfaces of the gas channel members 42G are provided with films 47G formed of a water-retentive or hydrophilic material. This allows the atomized water that has flowed back upstream and formed droplets on wall surfaces to be retained by the films 47G and re-vaporized by the reformed gas.

Figure 9:
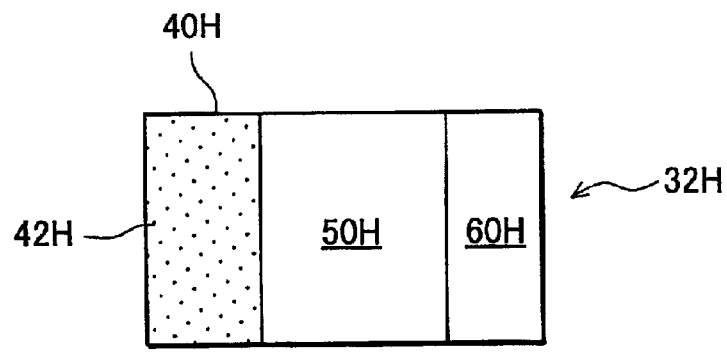
FIG. 9 shows the heat exchanger 32H of a seventh modified example.
Figure 10:
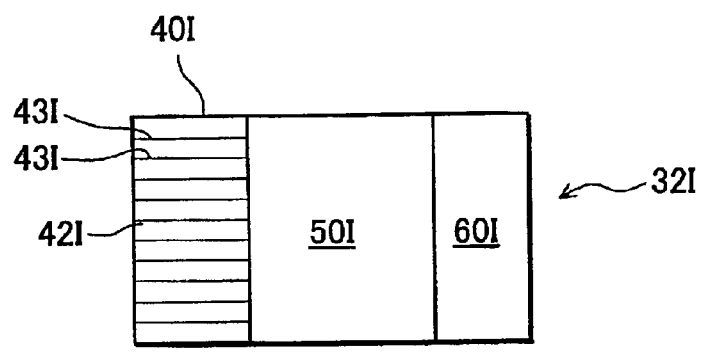
FIG. 10 shows the heat exchanger 32I of a eighth modified example.
Figure 11:
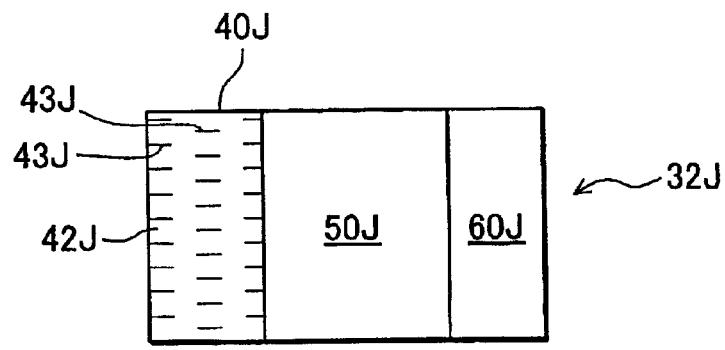
FIG. 11 shows the heat exchanger 32J of a ninth modified example.
Figure 12:
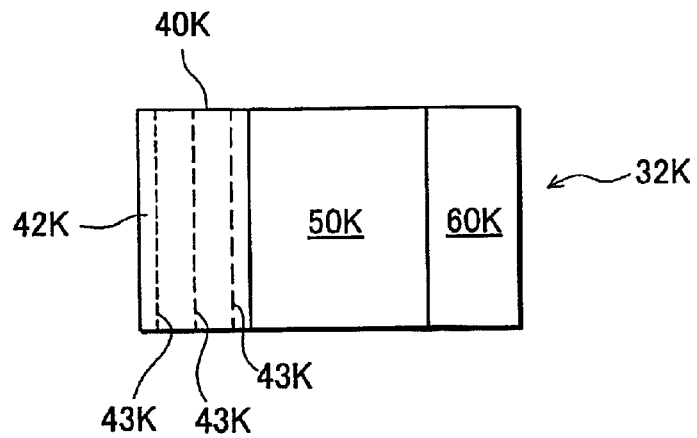
FIG. 12 shows the heat exchanger 32K of a tenth modified example.
Figure 13:
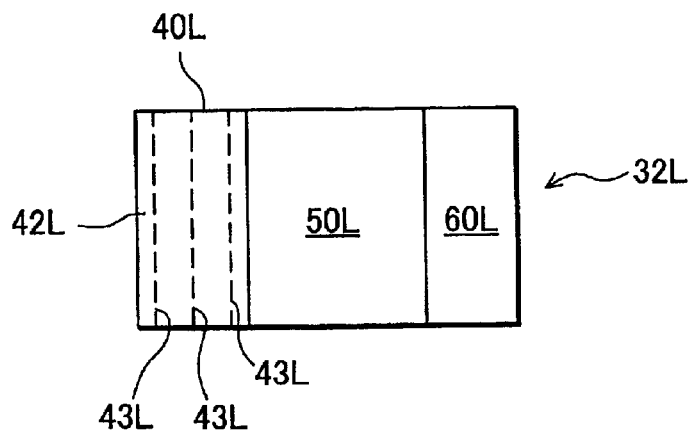
FIG. 13 shows the heat exchanger 32L of a eleventh modified example.
Figure 14:
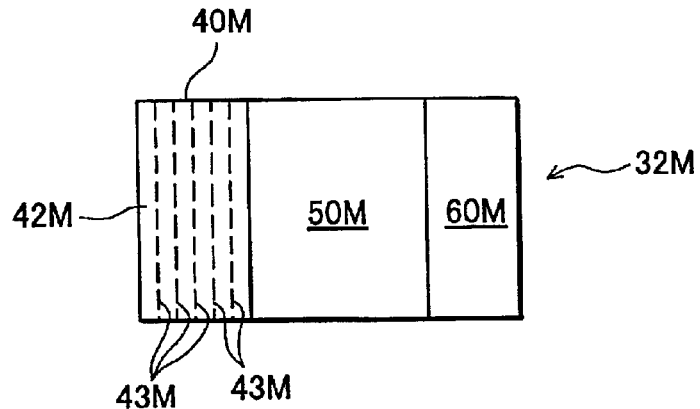
FIG. 14 shows the heat exchanger 32M of a twelfth modified example.

The following variations can also be adopted for the gas channel members 42. In a modified heat exchanger 32H shown in FIG. 9, porous bodies are used to form the gas channel members 42H. A plurality of honeycomb 43I are used in another modified heat exchanger 32I shown in FIG. 10. Louver fins 43J are used in a modified heat exchanger 32J shown in FIG. 11. A plurality of straightening vanes 43K having a plurality of holes of various sizes are used in a modified heat exchanger 32K shown in FIG. 12. A plurality of straightening vanes 43L having a plurality of holes of the same size are arranged to provide a staggering hole arrangement in a modified heat exchanger 32L shown in FIG. 13. A large number of straightening vanes 43M are used in a modified heat exchanger 32M shown in FIG. 14. The gas channel members are appropriately selected with consideration for thermal efficiency, heat capacity, pressure drop of reformed gas, and available equipment space.

Figure 15:
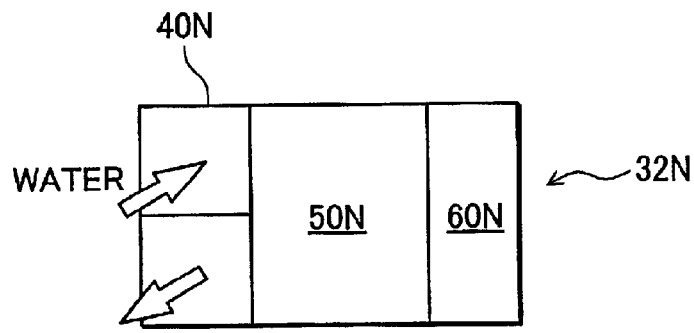
FIG. 15 shows the heat exchanger 32N of a thirteenth modified example.
Figure 16:
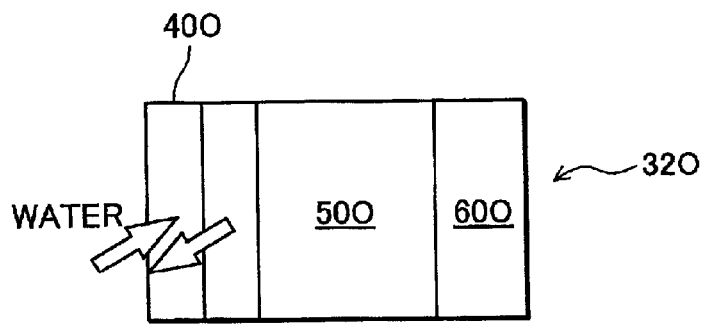
FIG. 16 shows the heat exchanger 32O of a fourteenth modified example.
Figure 17:
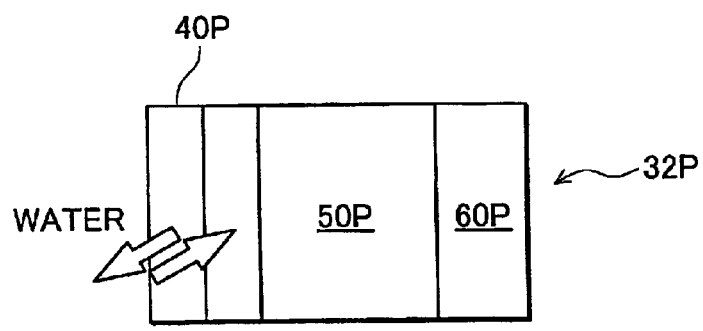
FIG. 17 shows the heat exchanger 32P of a fifteenth modified example.

FIG. 15 shows another modification 32N in which the water channel members 44N is configured such that water flows horizontally first on the upper side in the first heat exchanger 40N and then on the lower side thereof. With this arrangement as well, the temperature of the reformed gas passing through the bottom path can be higher than that of the reformed gas flowing through the upper path. FIG. 16 shows another modification 32O in which the water channel members 44O is configured such that water flows horizontally first on the downstream side in the water channel members 44O, and then flows horizontally on the upstream side thereof. Conversely, the water channel members 44P may be configured such that water flows horizontally first on the upstream side in the water channel members 44P, and then flows horizontally on the downstream side thereof, as shown in another modified heat exchanger 32P shown in FIG. 17. This allows heat transfer efficiency to be improved. These modified examples have a folded section that forces water to flow in a roundabout way.

Figure 18:
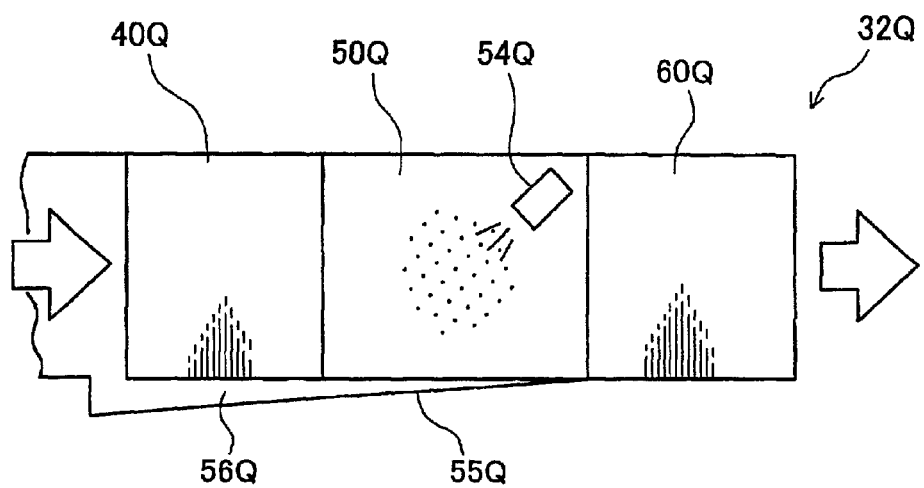
FIG. 18 shows the heat exchanger 32Q of a sixteenth modified example.
Figure 19:
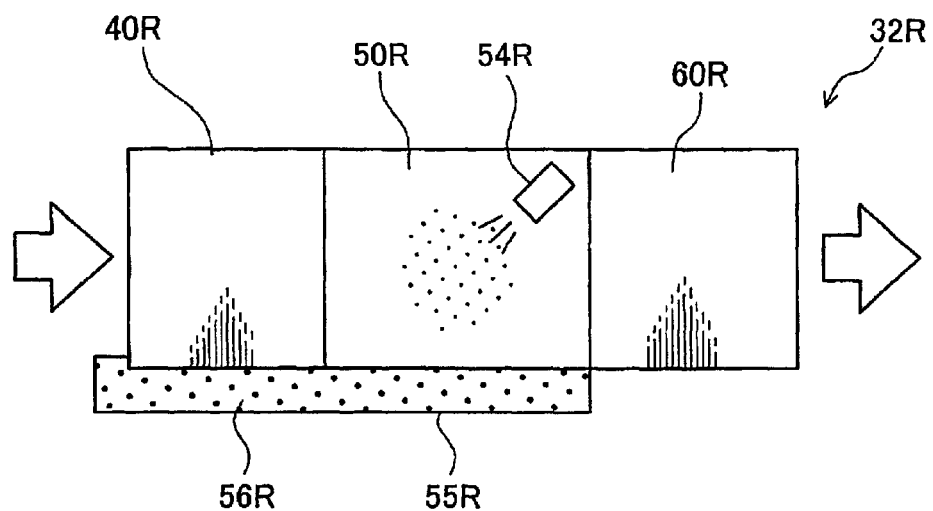
FIG. 19 shows the heat exchanger 32R of a seventeenth modified example.

FIG. 18 shows another modification 32Q in which the bottom plate 55Q of the second heat exchanger 50Q constitutes a slope which is lower on the upstream side, and a connection space 56Q is provided under the first heat exchanger 40Q for connecting the bottom of the second heat exchanger 50Q and the gas inlet of the first heat exchanger 40Q. This arrangement allows water precipitated on the bottom plate 55Q to be guided toward the gas inlet of the first heat exchanger 40Q and vaporized by the higher-temperature reformed gas. It is also possible to dispense with the connector 56Q and to merely configure the second heat exchanger 50Q such that the bottom plate 55Q thereof constitutes a slope which is lower on the upstream side. In this case as well, the water accumulated on the bottom surface 55Q can be vaporized by the high-temperature reformed gas in the second heat exchanger 50Q. FIG. 19 shows another modification 32R in which a connector 56R composed of a moisture-permeable porous material is provided in a region stretching from the bottom plate 55R of the second heat exchanger 50R all the way to the bottom of the gas inlet of the first heat exchanger 40R. Alternatively, the connector 56R may be composed of a material having capillary action instead of the moisture-permeable porous material. It is also possible to utilize the phase changes in water in the same manner as with the heat pipes, and to guide the water precipitated on the bottom plate 55 toward the gas inlet of the first heat exchanger 40R on the basis of the pressure difference between the inlet and outlet of the first heat exchanger 40R. In the heat exchanger 32R provided with such connector 56R, the water accumulated on the bottom plate 55R can also be guided toward the gas inlet of the first heat exchanger 40R and vaporized by the higher-temperature reformed gas. The arrangement based on the pressure difference does not depend on gravity and is not subjected to any limitations in terms of equipment configuration or placement considerations.

Although the heat exchanger 32 of the first embodiment has two nozzles 54 for atomizing water, the water can be sprayed from three or more nozzles or from a single nozzle. The nozzles 54 may also be two-fluid type nozzles. In this case, one of the two fluids is water, and the other may be any of a variety of fluids. It is possible, for example, to use steam, or to use the off-gas discharged from the anode or cathode side of a fuel cell when the fuel reforming apparatus 20 of the first embodiment is combined with the fuel cell. It is further possible to use a gas obtained by the treatment of the off-gas discharged from the anode or cathode side of a fuel cell, or to use combustion gas from an evaporator when this evaporator is provided in the fuel reforming apparatus. By atomizing water from a two-fluid nozzle in this manner, it is possible to further pulverize the sprayed water particles and to additionally reduce the time needed for water vaporization when impact between discharged jets is utilized as well. In particular, the amount of sprayed water can be reduced by using steam as the other of the two fluids. In addition, using the off-gas of a fuel cell as the other of the two fluids allows the steam in the off-gas to be recycled and the amount of sprayed water to be reduced in proportion thereto. No driving force is needed to achieve such an addition. As a result, the apparatus can be made more compact.

Figure 20:
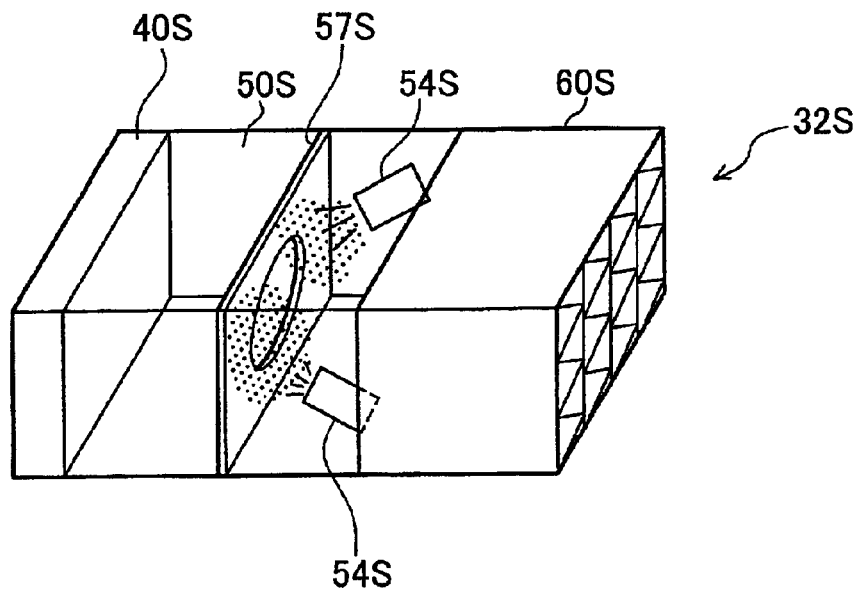
FIG. 20 shows the heat exchanger 32S of a eighteenth modified example.
Figure 21:
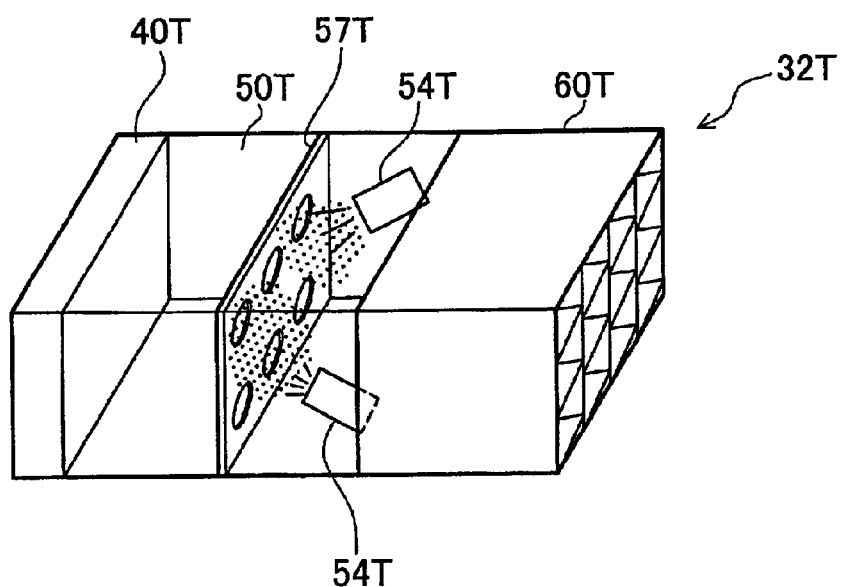
FIG. 21 shows the heat exchanger 32T of a nineteenth modified example.

FIG. 20 shows another modification 32S in which the second heat exchanger 50S is provided with a stirring/mixing plate 57S having one orifice for stirring and mixing the flow of reformed gas. A modification 32T show in FIG. 21 is provided with a stirring/mixing plate 57S having a plurality of orifices. These stirring/mixing plates 57S, 57T disrupts the flow of reformed gas, allowing the sprayed water and reformed gas to be mixed more uniformly and the vaporization of sprayed water to be facilitated by the efficient use of reaction volume due to more uniform mixing. Although the modified heat exchangers 32S and 32T are described with reference to the use of stirring/mixing plates 57S and 57T provided with a single orifice or a plurality of orifices, it is also possible to use any other arrangement as long as this arrangement causes the flow of reformed gas to be disrupted.

Figure 22:
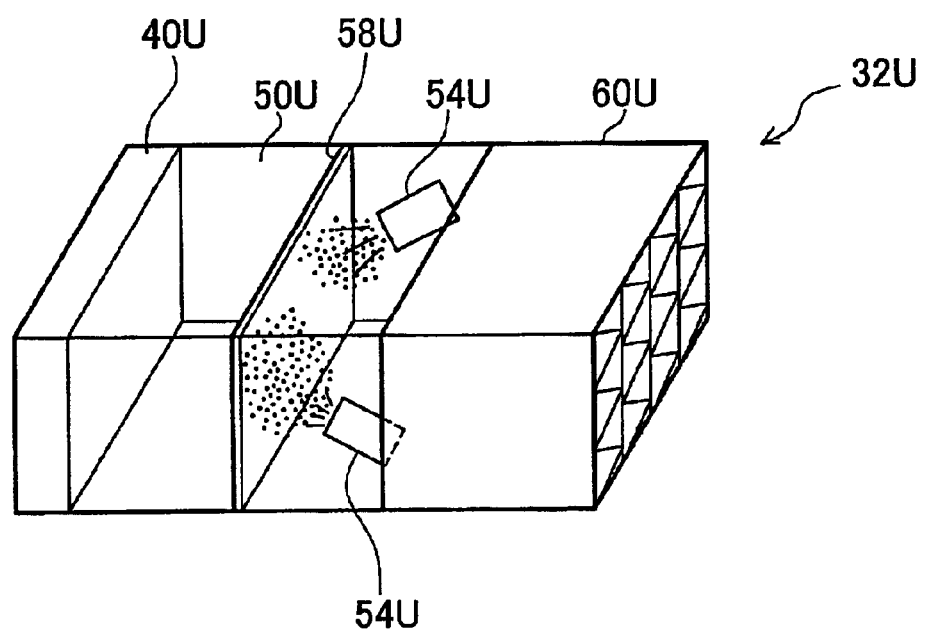
FIG. 22 shows the heat exchanger 32U of a twentieth modified example.

FIG. 22 shows another modification 32U in which water is sprayed from the nozzles 54U onto a vaporization plate 58U composed of a gas-permeable porous material. The sprayed water is vaporized and mixed at the same time on the plate 58U as the reformed gas passes through the plate 58U.

Although the third heat exchanger 60 of the first embodiment (FIG. 2) is constituted by a plurality of mixed gas channels 62 separated by a plurality of wall surfaces, it is also possible to use any other structure as long as this structure allows water precipitated on the wall surfaces to be vaporized. The mixed gas channels 62 can adopt an arrangement in which gases are prevented from flowing in a straight line in the manner described with reference to the gas channel members 42B–42E in FIGS. 3–6, an arrangement in which channel surfaces are coated with a water-retaining or hydrophilic film in the manner described with reference to the gas channel members 42G in FIG. 8, or an arrangement in which the gas flow is restricted in the manner described with reference to the gas channel members 42I–42M in FIGS. 10–14. With these arrangements, the sprayed water can be prevented from remaining in liquid state and entering the water gas shift reactor 34 at the downstream side. Accordingly, the heat transfer efficiency can be improved, and the water precipitated on wall surfaces can be re-vaporized. The construction of the third heat exchanger 60 is appropriately selected with consideration for thermal efficiency, heat capacity, pressure drop of reformed gas, and available equipment space.

Although the first heat exchanger 40 of the first embodiment (FIG. 2) is constituted by a plurality of gas channel members 42 and water channel members 44, and the third heat exchanger 60 is constituted by a plurality of mixed gas channels 62, it is also possible to adopt an arrangement in which the first heat exchanger 40 or third heat exchanger 60 is provided with a heater, such as EHC (Electric Heated Catalyst) and EH (Electric Heater). This arrangement allows the first heat exchanger 40 or third heat exchanger 60 to be heated during the startup of the apparatus, and warming to be rapidly completed.

Although the heat exchanger 32 of the first embodiment is constituted by three heat exchangers 40, 50, and 60, it is also possible to adopt an arrangement in which the heat exchanger 32 comprises a first heat exchanger 40 and a second heat exchanger 50 alone, a second heat exchanger 50 and a third heat exchanger 60 alone, or a second heat exchanger 50 alone. A structure devoid of the first heat exchanger 40 can be operated such that unheated water is sprayed from the nozzles 54 or that a water heating apparatus is provided and heated water is sprayed from the nozzles 54. A structure devoid of the first heat exchanger 40 can also be operated such that the uppermost upstream side of the second heat exchanger 50 is provided with a plurality of fins such that the water sprayed in the second heat exchanger 50 is prevented to flow back into the reforming reactor 30. In this case, water precipitated on the fins can be efficiently re-vaporized by configuring the fins from a high heat transfer material with sufficient surface of contact with the reformed gas.

C. Second Embodiment

Figure 23:
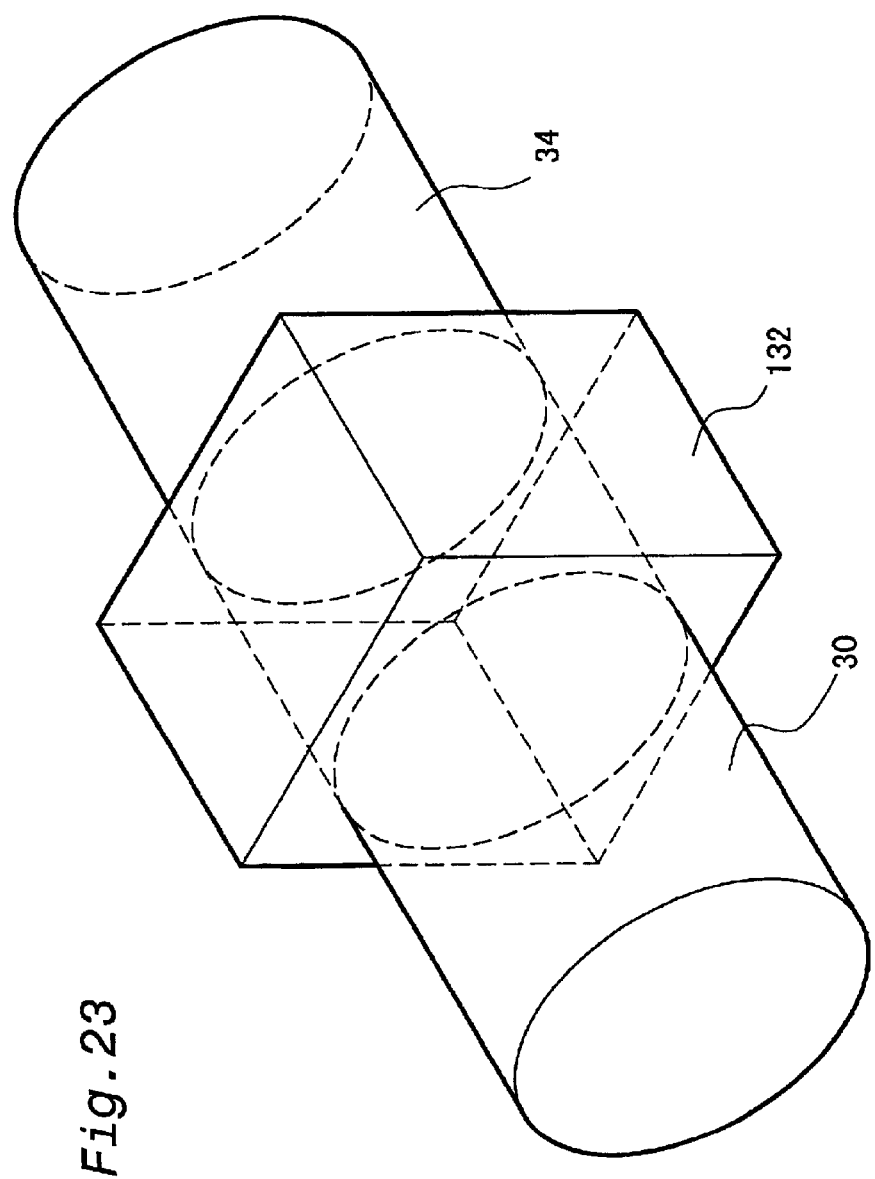
FIG. 23 is a diagram depicting the manner in which a heat exchanger 132 is connected to the reforming reactor 30 and water gas shift reactor 34.

FIG. 23 shows an outer shape of a heat exchanger 132 connected with the reforming reactor 30 and water gas shift reactor 34 in a second embodiment. Elements other than the heat exchanger 132 are the same as those of the first embodiment shown in FIG. 1. The same symbols will be used for structures similar to those used for the fuel reforming apparatus 20 of the first embodiment.

Figure 24:
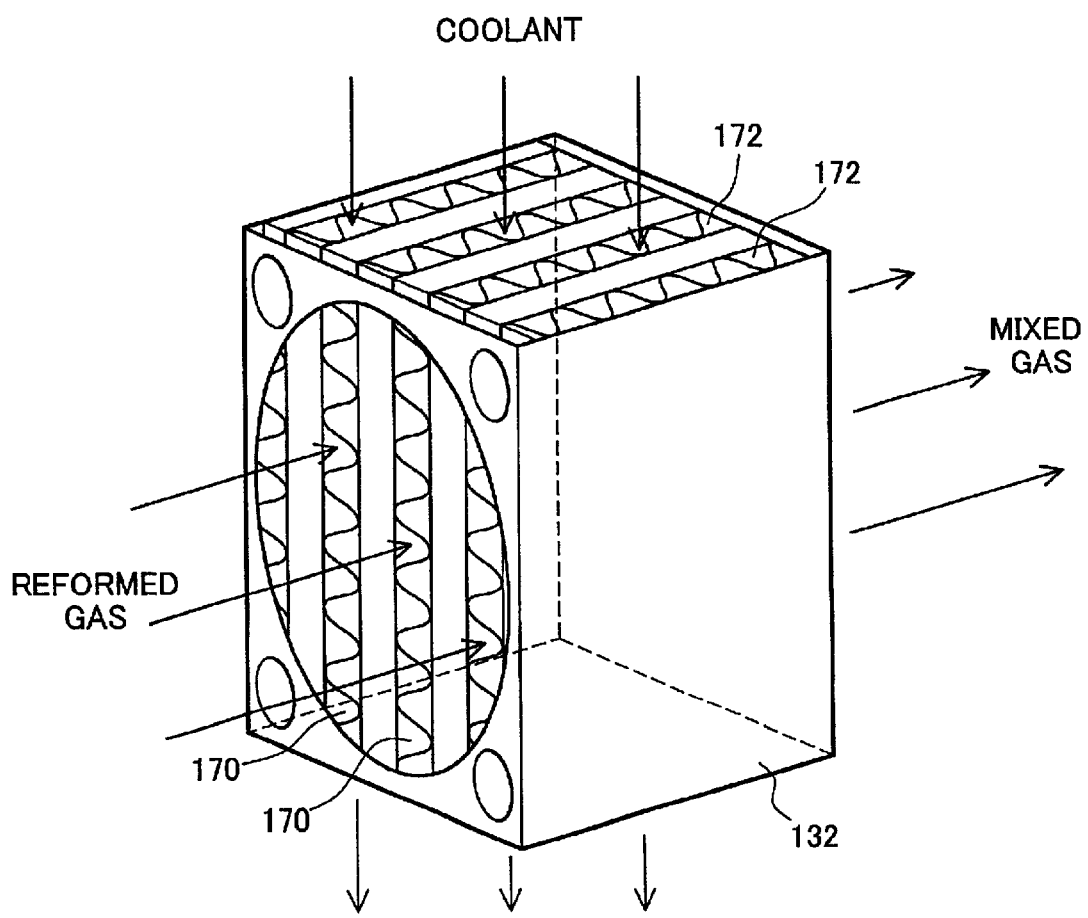
FIG. 24 is a diagram outlining part of the structure of the heat exchanger 132.
Figure 25:
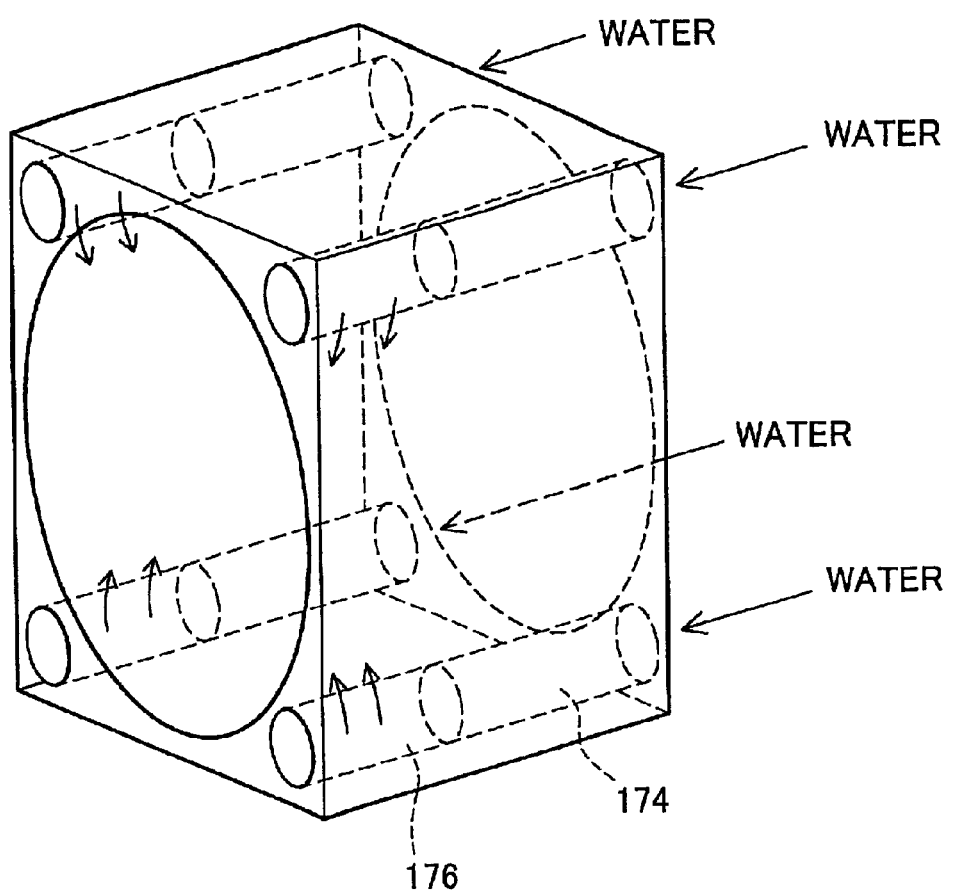
FIG. 25 is a diagram outlining part of the structure of the heat exchanger 132.

FIGS. 24 and 25 illustrate the structure of the heat exchanger 132. As can be seen in FIG. 24, the structure of the heat exchanger 132 is similar to that of the first heat exchanger 40 shown in FIG. 2. Specifically, the heat exchanger 132 is a stack of first layers consisting of reformed gas channels 170 and second layers consisting of coolant channels 172. The first and second layers are alternately stacked such that they are capable of exchanging heat with each other. The reformed gas fed from the reforming reactor 30 passes through the reformed gas channels 170 and cooled by the coolant passing through the coolant channels 172.

The coolant, for example, air introduced from the outside, flows through the coolant channels 172 from top to bottom in the vertical direction. The temperature in the heat exchanger 132 therefore gradually increases in the downward direction. Consequently, unvaporized or precipitated water can be vaporized with greater speed in the hotter bottom region of the reformed gas channels 170.

The heat exchanger 132 further comprises, as shown in FIG. 25, heating units 174 constructed as water channels, and vaporization units 176 connected to the heating units 174. The vaporization units 176 are composed of porous bodies. Those units 174 and 176 are provided at the corner regions of the rectangular parallelepiped heat exchanger 132. The shape of the heat exchanger 132 is due to its inner structure; the stack of quadrilateral tabular layers substantially identical in shape. By contrast, the reforming reactor 30 and water gas shift reactor 34 connected to the heat exchanger 132 are cylinders with substantially circular channel cross sections, as shown in FIG. 23. Consequently, the reformed gas flows relatively slow at the corner or peripheral regions of the heat exchanger 132. The heating units 174 and vaporization units 176 are configured parallel to the direction of gas flow in the peripheral regions of reformed gas channels.

The heating units 174 (FIG. 25) is supplied with water from the water tank 22 (FIG. 1). The water flowing through the heating units 174 is heated up by the reformed gas passing through the reformed gas channels 170 via the structural members of the heat exchanger 132. Heated water from the heating units 174 is fed to the porous vaporization units 176. As it passes through the porous bodies, the water is heated further by the reformed gas traveling through the reformed gas channels 170 via the structural members, and is vaporized and added to the reformed gas inside the reformed gas channels 170 from inside the porous bodies.

Figure 26:
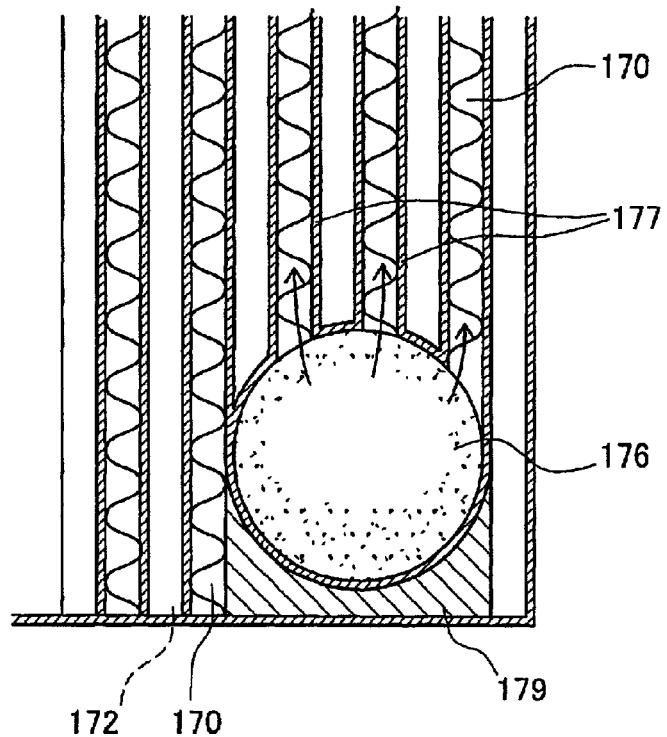
FIG. 26 is a diagram depicting part of a cross section through the heat exchanger 132.

FIG. 26 is a cross-sectional view of the heat exchanger 132 and vaporization unit 176. The vaporization unit 176 and the ends of the reformed gas channels 170 are connected along the peripheries of the vaporization units 176. The heated water in the vaporization unit 176 is vaporized into the reformed gas in the reformed gas channels 170. In FIG. 26, water from a single vaporization unit 176 is introduced into three reformed gas channels 170.

Figure 27:
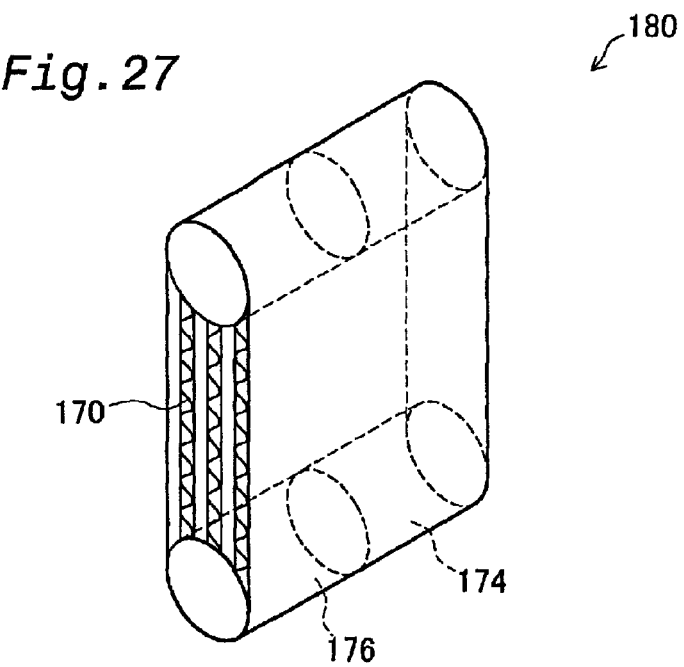
FIG. 27 is a perspective view schematically depicting the exterior of a vaporization unit 180.
Figure 28:
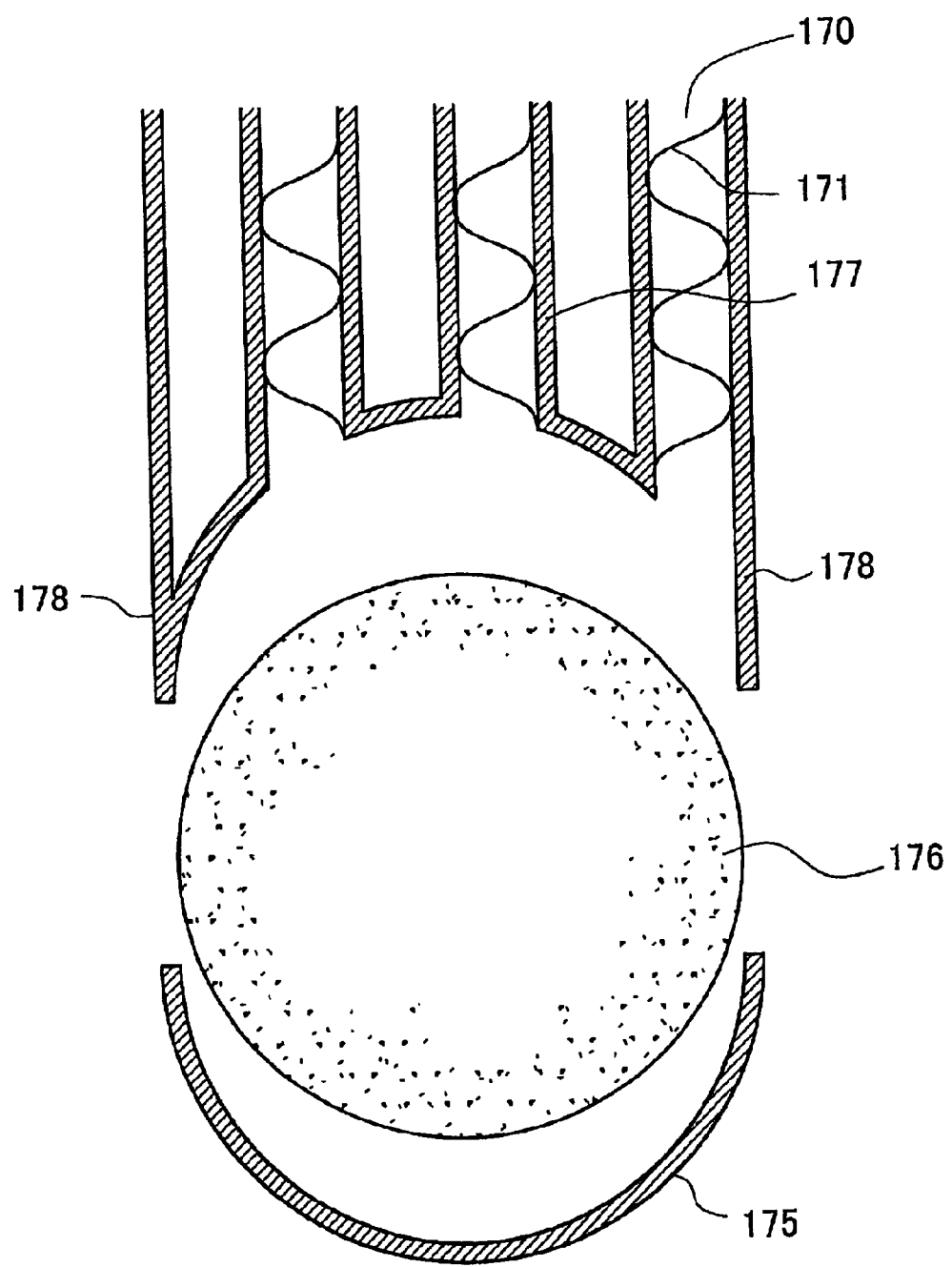
FIG. 28 is a diagram schematically illustrating the manner in which the vaporization unit 180 is assembled.

FIG. 27 is a perspective view schematically depicting a vaporization unit assembly 180 including heating units 174, vaporization units 176, and reformed gas channels 170. The vaporization unit assembly 180 is pre-fabricated prior to the assembly of the heat exchanger 132. FIG. 28 is an exploded view of the vaporization unit assembly 180.

Reformed gas channels 170 in the vaporization unit 180 are constructed by alternate stacking of spacer plates 177 and fins 171. The spacer plates 177 may be either hollow or solid. The heating units 174 and the porous vaporization units 176 are disposed at the opposite ends of the stacked structure comprising the fins 171 and spacer plates 177. The heating unit 174 (FIG. 27) has a cylindrical shape open at both ends, which act as an water inlet and an outlet to the vaporization unit 176.

The vaporization units 176 and heating units 174 are surrounded by shell plates 175 at opposite ends. Furthermore, external plates 178 are placed on both sides of the stack including the fins 171 and spacer plates 177. Assembling the vaporization unit assembly 180 entails combining the aforementioned stack, the heating units 174, and the porous vaporization units 176 to obtain an internal core, placing the shells 175 and external plates 178, and connecting the ends of these members with each other. Metal materials having high heat conductivity are used herein as elements other than the porous vaporization units 176, that is, as the materials of the fins 171, spacer plates 177, heating units 174, shells 175, and external plates 178. The ends of the shells 175 and external plates 178 are connected, for example, by soldering. This structure allows the water in the vaporization units 176 to be introduced solely in the reformed gas channels 170 inside the vaporization unit assembly 180.

The heat exchanger 132 is assembled as follows. A plurality of quadrilateral plates of identical shape are stacked while the fins 171 are disposed therebetween to make the coolant channels 172 and reformed gas channels 170. The vaporization unit assembly 180 is then placed on both sides of the stack. Fixing members 179 (FIG. 26) are provided at the corners of the box casing of the heat exchanger 132 in order to fix the vaporization unit assembly 180 in place. The heat exchanger 132 thus assembled is connected to the reforming reactor 30 (FIG. 23) in order to feed the reformed gas to the reformed gas channels 170, and is connected to the water gas shift reactor 34 in order to allow the mixed gas discharged from the reformed gas channels 170 to be fed to the water gas shift reactor 34. The heat exchanger 132 is also connected to a coolant feeder (not shown) in order to allow the coolant to travel through the coolant channels 172.

Although the coolant flows through the coolant channels 172 as shown in FIG. 24, it is prevented from circulating inside the vaporization unit assembly 180 (FIG. 26) because the space between the spacer plates 177 are blocked off from the vaporization units 176 and heating units 174 (FIG. 25). In other words, the vaporization unit assembly 180 has no coolant channels 172. The spacer plates 177 prevent steam from penetrating inside. The spacer plates 177 are preferably made of solid plates in order to improve heat transfer throughout the heat exchanger 132. Alternatively, the spacer plates 177 may be replaced with the reformed gas channels 170. In other words, the stack portion of the vaporization unit assembly 180 except for the heating units 174 and vaporization units 176 may be constructed as the reformed gas channels 170.

Figure 29:
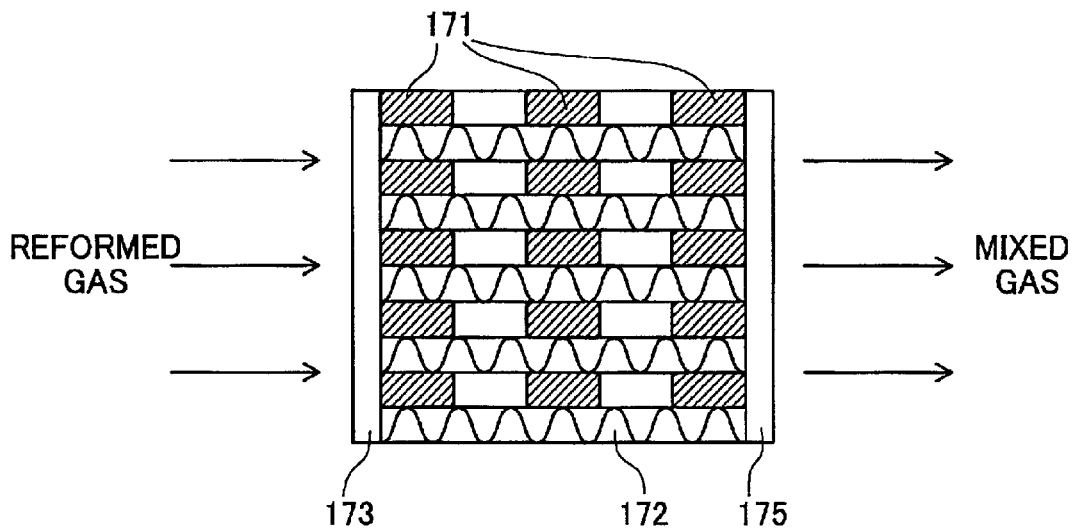
FIG. 29 is a schematic showing the heat exchanger 132 from the side.
Figure 30:
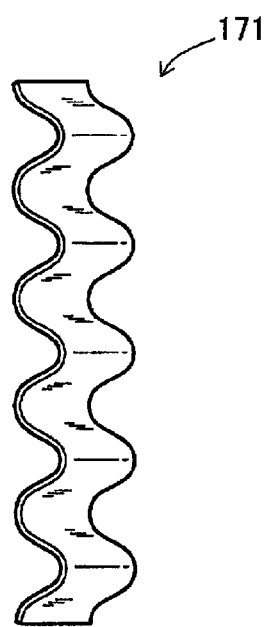
FIG. 30 is a diagram illustrating the structure of fins 171.

FIG. 29 is a top view of the heat exchanger 132 shown in FIG. 24. As described above, fins are provided inside the reformed gas channels 170 in order to achieve higher heat exchange efficiency. FIG. 20 shows the fin 171 mounted inside the reformed gas channels 170. The fin 171 is an undulating member having a prescribed width, and a plurality of such fins 171 are mounted at regular intervals inside each reformed gas channel 170 as shown in FIG. 29. Consequently, steam supplied from the vaporization unit 176 can diffuse throughout the entire reformed gas channel 170 connected with the vaporization unit 176 as the reformed gas travels through the reformed gas channel 170.

The heat exchanger 132 is further provided with a gas distribution chamber 173 at the inlet and a gas collection chamber 175 at the outlet (FIG. 29). The reformed gas fed to the heat exchanger 132 is distributed by the gas distribution chamber 173 among the reformed gas channels 170. The reformed gas discharged by the reformed gas channels 170 is collected by the gas collection chamber 175. The gas collection chamber 175 thus allows all the reformed gas, including the reformed gas which do not receive any steam from the vaporization units 176, to be mixed with the steam and discharged as mixed gas toward the water gas shift reactor 34.

The width of the reformed gas channels 170 and coolant channels 172 can be arbitrarily set, and the settings should be appropriately selected with consideration for heat exchange efficiency, and pressure drop during gas passage.

The heating units 174 and vaporization units 176 may be made to have various shapes other than cylinders. For example, those units can be configured into a crescent shape along the circular cross section of the reforming reactor 30 and water gas shift reactor 34. A larger number of reformed gas channels 170 can be connected with the vaporization units 176 consequently. Alternatively, the heating units 174 and vaporization units 176 can be configured into quadratic prisms with quadrilateral channel cross sections to facilitate the fabrication of the heat exchanger 132.

As shown in FIG. 25, the flow direction of the water in the heating units 174 toward the vaporization units 176 is opposite from that of the reformed gas in the reformed gas channels 170. The reformed gas cools down by exchanging heat while passing through the heat exchanger 132, so the temperature decreases in the downstream direction. Consequently, the feeding of vaporized water from the vaporization units 176 to the reformed gas can be facilitated by mounting the vaporization units 176 near the upstream side, where the reformed gas has higher temperature.

According to the fuel reforming apparatus of the second embodiment described above, the steam obtained using the heat of the reformed gas is used for shift reactions. Thus the vaporization of water and the cooling of reformed gas are simultaneously and efficiently performed. In addition, the heat transfer is carried out highly efficiently because the passage of reformed gas (reformed gas channels 170) and that of water (the heating units 174 and vaporization units 176) are disposed in proximity to each other. The energy efficiency of the entire apparatus can thus be enhanced. It is also possible to reduce the overall size of the device for vaporizing water and cooling the reformed gas.

In addition, the addition of the heating units 174 and vaporization units 176 does not unduly increase the size of the heat exchanger 132 because these units 174, 176 are mounted in the peripheral regions which are outside the circular flow area of the reforming reactor 30 and water gas shift reactor 34. The reformed gas typically flows at a low rate in the peripheral regions of the heat exchanger 132. The peripheral regions accordingly increase the heat capacity of the heat exchanger 132 and reduce its heat exchange efficiency. However, the heat exchange efficiency of the entire heat exchanger 132 can be increased by mounting the heating units 174 and vaporization units 176 in the peripheral regions, and by supplying these units 174, 176 with water that is different from the coolant flowing through the coolant channels 172.

The reforming reactor 30 and water gas shift reactor 34 are typically designed to promote catalyst reactions, and configured as cylinders with substantially circular cross sections in order to create a uniform gas flow throughout the reactors. The heat exchanger 132, which is obtained by stacking the structural members for forming reformed gas channels 170 and coolant channels 172 such that the reformed gas and coolant flow in mutually orthogonal directions, can be manufactured with greater ease when the tabular members are stacked into a rectangular parallelepiped. Consequently, the heat exchanger 132 is configured such that an excess space forms in the peripheral regions. This space reduces the flow rate of reformed gas and has an adverse effect on heat exchange efficiency. A structure in which heating units 174 and vaporization units 176 are mounted in such regions is therefore particularly useful for the efficient utilization of this space.

In the heat exchanger 132 of the second embodiment, the water fed to the heating units 174 and another coolant flowing through the coolant channels 172 are used for cooling the reformed gas. The use of a plurality of coolant systems improves controllability of the reformed gas temperature. The amount of water to be fed to the heating units 174 and vaporization units 176 is determined in accordance with the amount of steam to be mixed with the reformed gas and supplied for shift reactions. Using additional coolant other than the water fed to the vaporization units 176 makes it possible to control the cooling state of the reformed gas without imposing restrictions on the amount of steam to be added to the reformed gas. The use of a plurality of coolant systems makes it possible to obtain a more compact heat exchanger 132 because the reformed gas can be cooled more thoroughly.

Although air introduced from the outside is used as the coolant flowing through the coolant channels 172 in the above second embodiment, it is also possible to use the water stored in the water tank 22 (FIG. 1), or the hydrocarbon-based fuel stored in the fuel tank 24. The air or hydrocarbon-based fuel used as a coolant in the heat exchanger 132 can be utilized in the reforming reactions occurring in the reforming reactor 30, including partial oxidation reactions and steam reforming reactions. Adopting this arrangement makes it possible to reduce the energy needed to heat these fluids before they are fed to the reforming reactor 30, improving the energy efficiency of the entire apparatus.

D. Modifications of Second Embodiment (D-1) Modification 1

The vaporization units 176 may be replaced with one or more atomizers for spraying the reformed gas with water in the same manner as in the first embodiment. In this case as well, energy efficiency can be increased, the heat exchanger can be made more compact, and other effects can be obtained by providing conduits, such as the heating units 174, for heating water before it is sprayed.

(D-2) Modification 2

Although the coolant passing through the coolant channels 172 is not used as the water to be mixed with the reformed gas, it is possible to utilize the water that has passed through the coolant channels 172 to humidity the reformed gas. The same effects can be achieved in this case as well. Namely, energy efficiency can be enhanced and the heat exchanger made more compact. When vaporization units composed of porous bodies are used for the humidification of the reformed gas, these effects can be further improved by placing the vaporization units in the peripheral regions of the heat exchanger 132 in the same manner as in the second embodiment.

(D-3) Modification 3

The heat exchanger 132 of the second embodiment may have an additional structure designed to promote the vaporization of unvaporized or precipitated water by the reformed gas. As described, for example, with reference to the modified examples of the heat exchanger 32 pertaining to the first embodiment, channel surfaces may be treated to form a film composed of a water-retaining or hydrophilic material downstream of the heat exchanger 132, for example, at the gas collection chamber 175 or downstream of the reformed gas channels 170. Alternatively, the channel surfaces in this region may be covered with a porous material. Adopting this arrangement allows water droplets to be retained by the film or the porous material, and the heat of reformed gas to be used to re-vaporize the water.

(D-4) Modification 4

Figure 31:
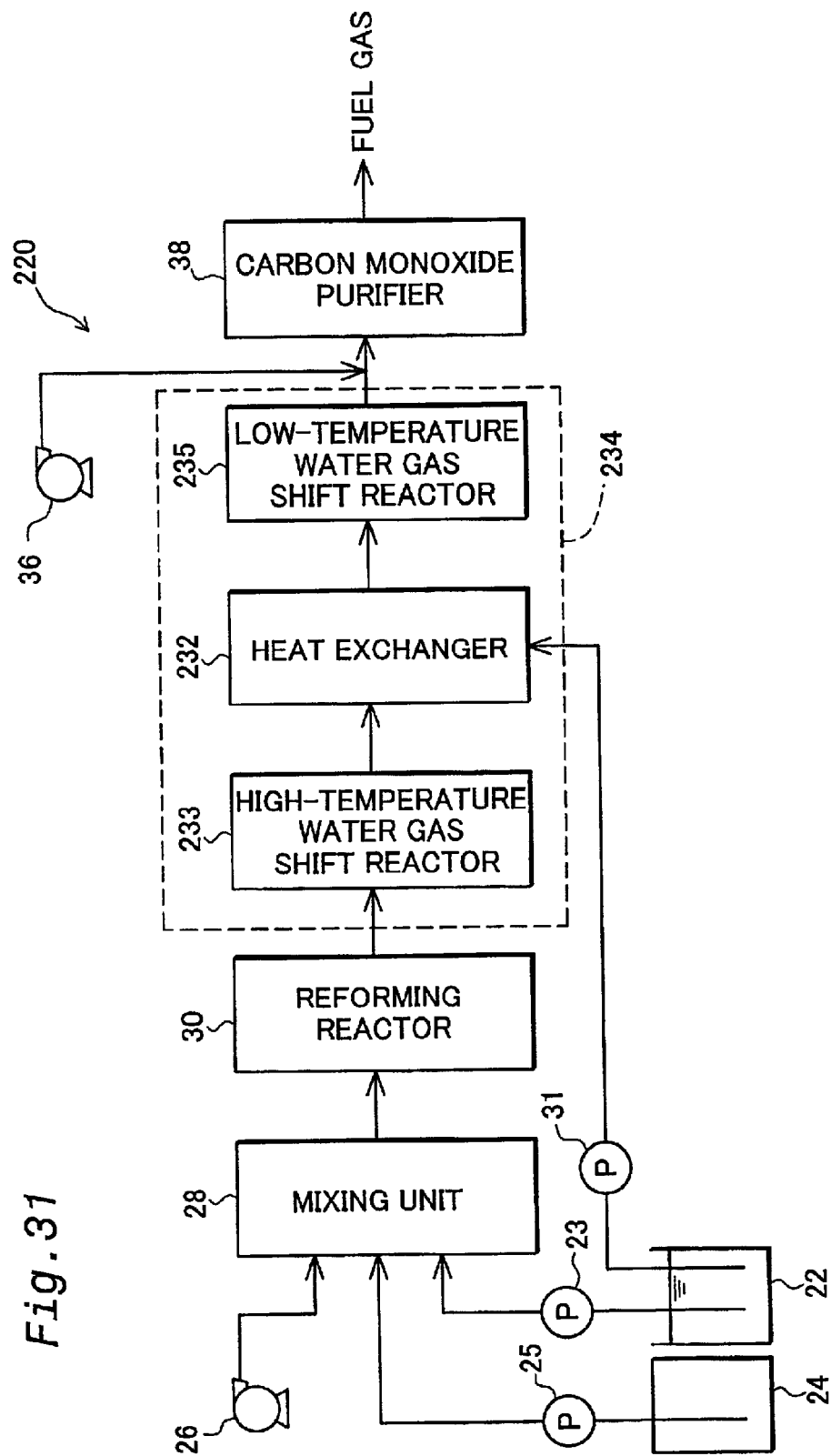
FIG. 31 is a block diagram outlining the structure of a fuel reforming apparatus 220 as a variation of the second embodiment.

Although the heat exchanger 132 is placed between the reforming reactor 30 and the water gas shift reactor 34, it is also possible to dispose this heat exchanger farther downstream. FIG. 31 shows the structure of such a fuel reforming apparatus 220, which is a modification of the second embodiment. The fuel reforming apparatus 220 is configured similarly to the fuel reforming apparatus 20 of the first embodiment, and the same symbols are assigned to the same elements. The water gas shift reactor 234 includes a high-temperature water gas shift reactor 233 for promoting shift reactions at higher temperatures, and a low-temperature water gas shift reactor 235 for promoting shift reactions at lower temperatures. The water gas shift reactor 234 further includes a heat exchanger 232 disposed between the reactors 233, 235. The heat exchanger 232 is identical to the heat exchanger 132 used in the second embodiment.

With this structure, the excessive heat of reformed gas can be used to vaporize the water used in the low temperature shift reactions when the reformed gas is cooled between the high-temperature water gas shift reactor 233 and low-temperature water gas shift reactor 235. Similar to the heat exchanger 132 described above, various other modifications can also be made. In addition, water heated in the heat exchanger 232 may be used for the shift reactions performed in the high-temperature water gas shift reactor 233.

E. Third Embodiment

Figure 32:
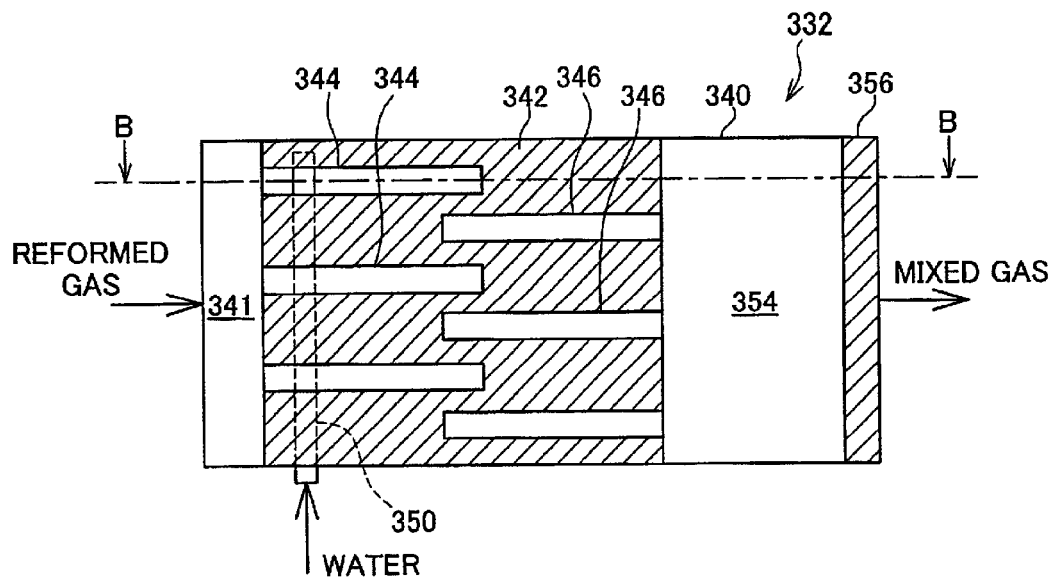
FIG. 32 is a block diagram outlining the structure of a heat exchanger 332 provided to the fuel reforming apparatus 20 of a third embodiment.
Figure 33:
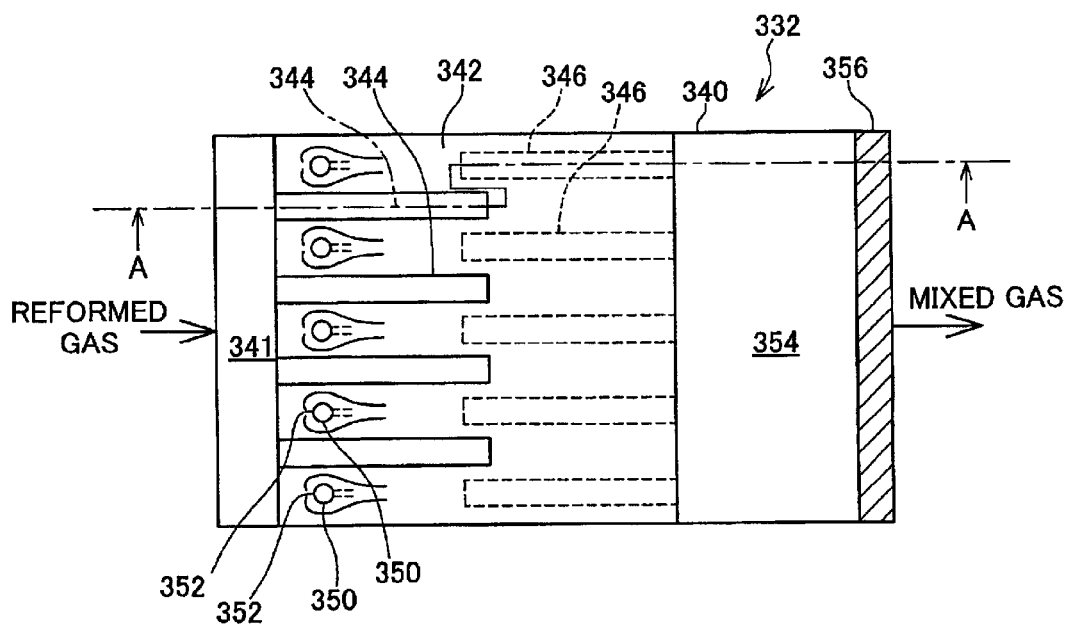
FIG. 33 is a cross section schematically depicting section B—B through the heat exchanger 332 shown in FIG. 32.

FIG. 32 is a block diagram outlining the structure of the heat exchanger 332 of a third embodiment of the present invention. FIG. 33 is a cross section schematically depicting section B—B through the heat exchanger 332 shown in FIG. 32. FIG. 32 corresponds to a cross section depicting section A—A in FIG. 33. The heat exchanger 332 is configured as a connector for connecting the reforming reactor 30 and water gas shift reactor 34 (FIG. 1) by means of a casing 340, and is equipped with a reformed gas permeable member 342 disposed in the casing 340 on the side near the reforming reactor 30, a plurality of water feeding pipes 350 for feeding liquid water to the reformed gas permeable member 342, and a mixed gas uniformalizing member 356 disposed in the casing 340 on the outlet side facing the water gas shift reactor 34.

The reformed gas permeable member 342 is composed of a gas-permeable porous material and is equipped with a plurality of gas introduction ports 344 for introducing reformed gas through a reformed gas manifold 341 disposed in the first half of the reformed gas permeable member 342. The member 342 is further equipped with a plurality of gas discharge ports 346 for facilitating the discharge of transmitted gas to a gas-mixing space 354 disposed between the reformed gas permeable member 342 and mixed gas uniformalizing member 356.

The plurality of water feeding pipes 350 are disposed in the reformed gas permeable member 342 on the side facing the reformed gas manifold 341, and are provided with a plurality of discharge ports 352 (FIG. 33) for discharging liquid water toward the reformed gas manifold 341, that is, in the direction opposite the direction of reformed gas flow. Liquid water is fed by the water pump 31 (FIG. 1) to the plurality of water feeding pipes 350.

The mixed gas uniformalizing member 356 is composed of a gas-permeable porous material and is designed to facilitate the mixing of gases in the gas-mixing space 354 and to feed the resulting mixture as a uniform stream to the water gas shift reactor 34.

In the heat exchanger 332 of the present embodiment thus configured, the reformed gas is cooled and the liquid water vaporized and mixed with the reformed gas in the following manner. The reformed gas fed from the reforming reactor 30 to the reformed gas manifold 341 enters the reformed gas permeable member 342 through the surface of the reformed gas permeable member 342 facing the reformed gas manifold 341 and through the surfaces of the gas introduction ports 344. Meanwhile, the liquid water discharged from the discharge ports 352 of the plurality of water feeding pipes 350 flows toward the gas-mixing space 354 while enveloping the water feeding pipes 350. In the process, the liquid water diffuses throughout the reformed gas flowing through the reformed gas permeable member 342, cools down the reformed gas by exchanging heat therewith, vaporizes, and mixes with the reformed gas. Providing the reformed gas permeable member 342 with a plurality of gas introduction ports 344 makes it possible to facilitate the introduction of reformed gas into the reformed gas permeable member 342 of the heat exchanger 332. As a result, it is possible to facilitate the mixing of the reformed gas and the vaporization of the liquid water fed through the plurality of water feeding pipes 350, and to cool the reformed gas with higher efficiency. In addition, configuring the plurality of discharge ports 352 such that liquid water being discharged flows over the water feeding pipes 350 makes it possible to make it more difficult for liquid water to boil in the plurality of water feeding pipes 350 because of the cooling effects demonstrated by liquid water and latent heat during evaporation. As a result, it is possible to suppress the sudden increase in the supply pressure drop of liquid water brought about the formation of a vapor lock in water feeding pipes 350, and an increase in the distribution of material discharged from the water feeding pipes 350, and to make the feeding of liquid water to the reformed gas permeable member 342 more controllable.

The reformed gas and steam in the reformed gas permeable member 342 are discharged toward the gas-mixing space 354 through the surface of the reformed gas permeable member 342 on the side facing the gas-mixing space 354 and through the surfaces of the gas discharge ports 346. Because a plurality of gas discharge ports 346 are provided to the reformed gas permeable member 342, vapor can be removed with greater speed from the reformed gas permeable member 342 on the gas discharge surfaces, which is believed to be the limiting stage of liquid water vaporization. This suppresses the increase in vapor pressure, and facilitates liquid water vaporization. In addition, the transmitted reformed gas or steam are prevented from remaining at the surface layer.

The reformed gas and steam discharged into the gas-mixing space 354 are uniformly mixed by means of the arrangement of the gas-mixing space 354 and mixed gas uniformalizing member 356, and the permeability of the mixed gas uniformalizing member 356. The reformed gas and steam is fed as a uniform stream to the water gas shift reactor 34 accordingly.

With the heat exchanger 332 of the third embodiment described above, the reformed gas can be cooled and the steam needed for a shift reaction can be admixed by the reformed gas permeable member 342 when the reformed gas travels through the member 342. In addition, providing the reformed gas permeable member 342 with a plurality of gas introduction ports 344 makes it possible to facilitate supply of the reformed gas into the reformed gas permeable member 342, vaporizing the liquid water thus fed, and mixing the resulting vapor with the reformed gas. Providing the reformed gas permeable member 342 with a plurality of gas discharge ports 346 makes it possible to facilitate liquid water vaporization and to inhibit the tendency of transmitted gas to remain in the surface border layer. In addition, providing the water feeding pipes 350 with a plurality of discharge ports 352 opposite the flow of reformed gas makes it possible to suppress the boiling of liquid water in the water feeding pipes 350 by allowing the discharged liquid water to envelop the water feeding pipes 350. Specifically, the discharged liquid water is vaporized around the water feeding pipes 350 by being brought into contact with the high-temperature reformed gas, allowing the water feeding pipes 350 to be efficiently cooled by the latent heat of evaporation.

Although the reformed gas permeable member 342 is provided with a plurality of gas introduction ports 344 and a plurality of gas discharge ports 346, it is also possible to omit either of the gas discharge ports 346 and the gas introduction ports 344, or both.

The water feeding pipes 350 may be constructed to discharge liquid water in an arbitrary direction. It is possible, for example, to form a plurality of discharge ports 352 such that liquid water is sprayed at an angle of about 90 degrees to the flow of reformed gas, or such that liquid water is sprayed in the same direction as the flow of reformed gas.

The plurality of water feeding pipes 350 may be constructed to be passages or holes formed within the reformed gas permeable member 342 such that liquid water is fed to the member 342 from the inner surfaces of the passages. Alternatively, it is possible to dispense with the plurality of water feeding pipes 350 and to feed liquid water through the side surface of the reformed gas permeable member 342 or reformed gas manifold 341.

Although the reformed gas permeable member 342 is composed of a gas-permeable porous material, any other material may also be used as long as this material is permeable to gases. For example, the reformed gas permeable member may be composed of a meshed material or a foamed material.

F. Fourth Embodiment

A fuel reforming apparatus of a fourth embodiment has the same structure as that of the third embodiment except that a differently constructed heat exchanger 432 is provided. For this reason, the description that follows will be limited to the heat exchanger 432 of the fourth embodiment, with the rest of the structure omitted from the description.

Figure 34:
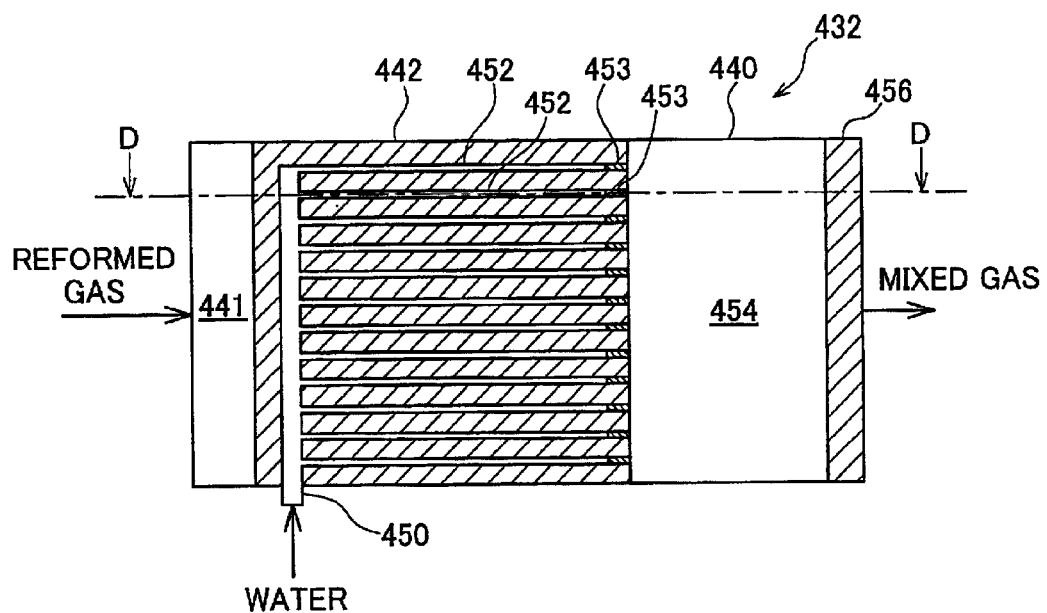
FIG. 34 shows the structure of a heat exchanger 432 provided to the fuel reforming apparatus of the fourth embodiment.
Figure 35:
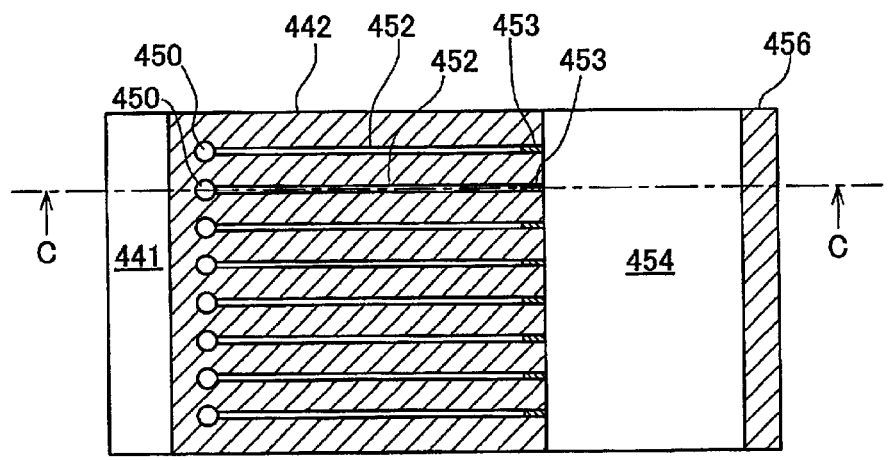
FIG. 35 is a cross section schematically depicting section D–D through the heat exchanger 432 shown in FIG. 34.

FIG. 34 is a block diagram outlining the structure of the heat exchanger 432 of the fourth embodiment, and FIG. 35 is a cross section schematically depicting section D—D through the heat exchanger 432 shown in FIG. 34. FIG. 34 corresponds to a cross section depicting section C—C in FIG. 35. As can be seen in the drawings, the heat exchanger 432 of the fourth embodiment is configured as a connector for connecting the reforming reactor 30 and water gas shift reactor 34 by means of a casing 440, and is equipped with a reformed gas permeable member 442 disposed in the casing 440 on the side near the reforming reactor 30, a plurality of water feeding pipes 450 for feeding liquid water to the reformed gas permeable member 442, and a mixed gas uniformalizing member 456 composed of a porous material and disposed in the casing 440 on the side facing the water gas shift reactor 34. The mixed gas uniformalizing member 456 is identical to the member 56 of the third embodiment.

The reformed gas permeable member 442 is composed of a gas-permeable porous material. The reformed gas permeable member 442 is configured such that a plurality of water feeding pipes 450 are embedded within the member 442 in a direction substantially orthogonal to the flow of reformed gas in the reformed gas permeable member 442 on the side near the reformed gas manifold 441 in the first half of the reformed gas permeable member 442. Embedded into the reformed gas permeable member 442 are a plurality of capillaries 452 that connect to the water feeding pipes 450 and open into a gas-mixing space 454 formed by the reformed gas permeable member 442 and mixed gas uniformalizing member 456. A stopper 453 of a porous material is fitted into the end portion of each capillary 452 on the side facing the gas-mixing space 454.

The plurality of capillaries 452 have a diameter of about 0.1–3 mm, and nucleators for forming boiling nuclei to facilitate water boiling are formed on the inner surfaces thereof. FIGS. 36(*a*)–36(*c*) illustrate examples of the inner surfaces of the capillaries 452; FIG. 36(*a*) depicts an undulating shape, FIG. 36(*b*) depicts narrow angled grooves, and FIG. 36(*c*) depicts a Thermo Excel configuration. Any shape can be used as long as this shape can provide boiling nuclei. Providing the capillaries 452 with boiling nuclei in this manner can facilitate boiling for the liquid water being supplied and can yield better heat transfer efficiency.

With the fuel reforming apparatus of the fourth embodiment thus configured, the reformed gas is cooled and the liquid water vaporized and mixed with the reformed gas in the following manner. The reformed gas fed from the reforming reactor 30 to the reformed gas manifold 441 is introduced into the reformed gas permeable member 442 through its inlet side, is caused to flow through the reformed gas permeable member 442 toward the gas-mixing space 454, and is fed to the gas-mixing space 454 through the outlet side of the reformed gas permeable member 442. Meanwhile, the liquid water fed to the plurality of water feeding pipes 450 is caused to flow through the plurality of capillaries 452, to cool the reformed gas flowing through the reformed gas permeable member 442 by exchanging heat with the reformed gas, to vaporize, and to enter the gas-mixing space 454 as steam through the stoppers 453. Because the capillaries 452 located on the side facing the gas-mixing space 454 are fitted with the stoppers 453, the liquid is prevented from splashing into the gas-mixing space 454 from the capillaries 452. The reformed gas and steam cooled and fed to the gas-mixing space 454 are mixed together in the gas-mixing space 454, brought into a uniform mixed state when passing through the mixed gas uniformalizing member 456, and fed as a uniform stream to the water gas shift reactor 34.

The heat exchanger 432 of the fourth embodiment described above allows reformed gas to be cooled and liquid water vaporized by causing the reformed gas passing through the porous reformed gas permeable member 442 to exchange heat with liquid water supplied to the plurality of capillaries 452. The presence of the gas-mixing space 454 and the mixed gas uniformalizing member 456 allows the reformed gas and steam to mix more uniformly, and the mixed gas to be fed as an uniformalized stream to the water gas shift reactor 34. In addition, liquid water vaporization can be facilitated by providing the inner surfaces of the plurality of capillaries 452 with the nucleators for forming boiling nuclei.

Although the stoppers 453 of the capillaries 452 are composed of a porous material, it is also possible to use any other material as long as this material is capable of preventing liquids from splashing. It is possible, for example, to form the capillaries from an foamed metal or a material having lattice-type walls, such as honeycomb tubes. It is further possible to use a fiber reinforced material in which fibers are woven in a meshed configuration.

The stoppers 453 may be dispensed with altogether. FIG. 37 shows a cross section of the capillary 452 devoid of the stopper 453. A moisture-retaining film 452B composed of a hydrophilic material or hygroscopic material may be partially provided to the inner surface of the capillaries 452 on the side facing the gas-mixing space 454 (FIG. 34). With this arrangement, some moisture can be retained by the moisture-retaining film 452B, making it possible to reduce the splashing of liquids into the gas-mixing space 454 from the capillaries 452.

The plurality of water feeding pipes 450 and capillaries 452 may be formed as passages or holes within the gas permeable member 452. With this arrangement, the liquid water in the plurality of capillaries 452 can be vaporized and fed through the plurality of capillaries 452 to the reformed gas permeable member 442 to achieve mixing and vaporization. Alternatively, the plurality of capillaries 452 can be composed of steel pipes, permeable tubes, or other materials.

It is also possible to omit the reformed gas permeable member 442, and to dispose a plurality of water feeding pipes 450 and capillaries 452 in the space occupied by the reformed gas permeable member 442. In this case, the capillaries 452 may provided with a plurality of fins, or metal grids may be mounted in the space occupied by the reformed gas permeable member 442 in order to facilitate heat exchange between the reformed gas and the water inside the capillaries 452. The capillaries 452 can have any clearance, but using a narrow clearance is preferred from the standpoint of improved heat transfer because reduced clearance yields better heat transfer.

Figure 38:
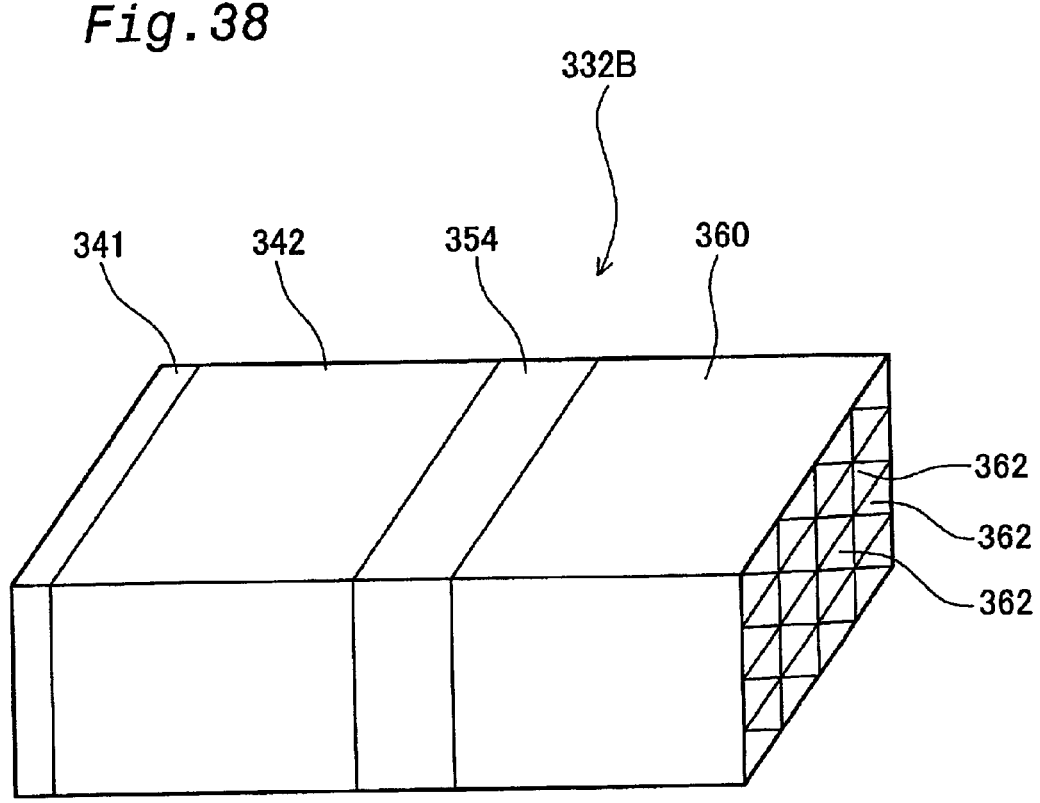
FIG. 38 is a diagram outlining the structure of a modified heat exchanger 332B.

FIG. 38 shows another heat exchanger 332B modified from the third embodiment shown in FIG. 32, in which the second half of the gas-mixing space 354 is provided with a vaporization regulator 60 for trapping and re-vaporizing unvaporized or precipitated water. This vaporization regulator 60 is composed of honeycomb tubes including a plurality of mixed gas channels 62 separated by a plurality of wall surfaces. In the mixed gas channels 62, the surface temperature of the walls is increased by the exchange of sensible heat with the reformed gas, and the unvaporized or precipitated water deposited on surface wall is vaporized to form a steam. The vaporization regulator 60 is not limited to being constructed from a plurality of mixed gas channels 62 and can also be composed of a gas-permeable porous material. The mixed gas channels 62 may also be provided with a plurality of heat transfer fins.

It is possible to omit some or all of the reformed gas manifolds 341, gas-mixing spaces 354, and mixed gas uniformalizing member 356 in the third embodiment. This also applies to the fourth embodiment.

The hydrocarbon-based fuel for the reforming apparatus is not limited to liquid propane and butane, but it is also possible to use gaseous hydrocarbons fuel such as methane and ethane, or various other hydrocarbon-based fuels such as gasoline, methanol, ether, and aldehyde.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuel reforming apparatus for reforming hydrocarbon-based fuel into hydrogen-rich fuel gas, comprising:
   a reforming reactor for reforming the hydrocarbon-based fuel into a reformed gas containing hydrogen and carbon monoxide;
   a water gas shift reactor for shifting the carbon monoxide to carbon dioxide using steam, thereby producing the carbon dioxide and hydrogen; and
   water feeding/mixing means for spraying the reformed gas with water, vaporizing the sprayed water, forming a mixture with the reformed gas, and feeding the mixed gas to the water gas shift reactor.

2. A fuel reforming apparatus as defined in claim 1, wherein the water feeding/mixing means includes means for atomizing water against a flow of the reformed gas at a prescribed angle.

3. A fuel reforming apparatus as defined in claim 1, wherein the water feeding/mixing means includes means for atomizing water at a prescribed angle with a direction of gravity.

4. A fuel reforming apparatus as defined in claim 1, wherein the water feeding/mixing means includes two or more spraying means for atomizing water.

5. A fuel reforming apparatus as defined in claim 4, wherein the two or more spraying means sprays water in a facing arrangement at a prescribed angle.

6. A fuel reforming apparatus as defined in claim 1, wherein the water feeding/mixing means includes a multi-fluid atomizer capable of spraying a plurality of fluids including water.

7. A fuel reforming apparatus as defined in claim 6, wherein the multi-fluid atomizer is configured to spray a steam-containing gas and the water.

8. A fuel reforming apparatus as defined in claim 7, wherein the steam-containing gas is an off-gas discharged by a hydrogen-consuming device for receiving a supply of the fuel gas and consuming at least part of the hydrogen in the fuel gas.

9. A fuel reforming apparatus as defined in claim 1, wherein the water feeding/mixing means includes backflow regulation means for regulating backflow of the sprayed water into the reforming reactor.

10. A fuel reforming apparatus as defined in claim 9, wherein the backflow regulation means includes means for facilitating deposition of water in the backflow of the sprayed water.

11. A fuel reforming apparatus as defined in claim 10, wherein the backflow regulation means includes means capable of vaporizing the deposited water by heat of the reformed gas.

12. A fuel reforming apparatus as defined in claim 1, wherein the water feeding/mixing means includes means for compressing and heating water, and means for spraying the compressed and heated water.

13. A fuel reforming apparatus as defined in claim 12, wherein the compressing and heating means includes means for heating the water to an approximate saturation temperature in compressed state.

14. A fuel reforming apparatus as defined in claim 12, wherein the compressing and heating means includes heat exchange means for heating water by heat exchange with the reformed gas.

15. A fuel reforming apparatus as defined in claim 14, wherein the heat exchange means includes reformed gas channels and water channels, the reformed gas channels and the water channels being arranged to allow heat exchange between the reformed gas and the water.

16. A fuel reforming apparatus as defined in claim 15, wherein the reformed gas channels and the water channels are arranged substantially orthogonal to each other.

17. A fuel reforming apparatus as defined in claim 15, wherein the water flows vertically from top to bottom within the water channels as a whole.

18. A fuel reforming apparatus as defined in claim 15, wherein the water flows from a downstream side to an upstream side of the reformed gas channels as a whole.

19. A fuel reforming apparatus as defined in claim 15, wherein the water flows from an upstream side to a downstream side of the reformed gas channels as a whole.

20. A fuel reforming apparatus as defined in claim 17, wherein the water flows through the water channels by a roundabout route.

21. A fuel reforming apparatus as defined in claim 15, wherein the water channels include a plurality of flat conduits disposed in parallel at regular intervals between the reformed gas channels.

22. A fuel reforming apparatus as defined in claim 15, wherein the reformed gas channels are configured such that at least outlet parts of the reformed gas channels make a prescribed angle with a direction of an overall flow of the reformed gas at a downstream side of the reformed gas channels.

23. A fuel reforming apparatus as defined in claim 15, wherein the reformed gas channels are configured to prevent the reformed gas from flowing in a straight line from inlets to outlets of the reformed gas channels.

24. A fuel reforming apparatus as defined in claim 15, wherein the reformed gas channels are configured such that at least surfaces near outlet parts of the reformed gas channels are provided with a film formed of a material selected from a group consisting of a hydrophilic material and a hygroscopic material.

25. A fuel reforming apparatus as defined in claim 15, wherein the reformed gas channels are provided with a plurality of fins at least in the vicinity of outlet parts of the reformed gas channels.

26. A fuel reforming apparatus as defined in claim 15, wherein the water feeding/mixing means includes a water passage disposed below the reformed gas channels of the heat exchange means, the water passage passing water between bottoms of inlet and outlet parts of the reformed gas channels.

27. A fuel reforming apparatus as defined in claim 26, wherein the water passage is composed of a porous material.

28. A fuel reforming apparatus as defined in claim 26, wherein the water passage is composed of a material capable of having capillary action.

29. A fuel reforming apparatus as defined in claim 26, wherein the water passage feeds the water between the inlet and outlet parts of the reformed gas channels on the basis of a pressure difference between the inlet and outlet parts.

30. A fuel reforming apparatus as defined in claim 1, wherein the water feeding/mixing means includes a casing for accommodating the mixed gas, the casing having a bottom surface inclined such that the bottom surface is lower at an upstream side of the reformed gas flow.

31. A fuel reforming apparatus as defined in claim 1, wherein the water feeding/mixing means includes stirring/mixing means for promoting stirring and mixing of the reformed gas flow.

32. A fuel reforming apparatus as defined in claim 31, wherein the stirring/mixing means includes an orifice provided in a flow path of the reformed gas.

33. A fuel reforming apparatus as defined in claim 1, wherein the water feeding/mixing means includes a vaporization member disposed in a flow path of the reformed gas for facilitating vaporization of the sprayed water into the reformed gas.

34. A fuel reforming apparatus as defined in claim 1, wherein the water feeding/mixing means includes vaporization means for facilitating vaporization of unvaporized water contained in the mixed gas.

35. A fuel reforming apparatus as defined in claim 34, wherein the vaporization means is disposed in a flow path of the mixed gas and is equipped with a member having a large area of contact with the mixed gas.

36. A fuel reforming apparatus as defined in claim 34, wherein the vaporization means includes a plurality of mixed gas channels for dividing the mixed gas into a plurality of streams.

37. A fuel reforming apparatus as defined in claim 36, wherein the mixed gas channels are configured to have a prescribed angle with the reformed gas flow at an upstream side of the mixed gas channels.

38. A fuel reforming apparatus as defined in claim 36, wherein the plurality of mixed gas channels are configured to prevent the mixed gas from flowing in a straight line from an inlet to an outlet of the mixed gas channels.

39. A fuel reforming apparatus as defined in claim 36, wherein the mixed gas channels are configured such that surfaces of the mixed gas channels are provided with a film formed of a material selected from a group consisting of a hydrophilic material and a hygroscopic material.

40. A fuel reforming apparatus as defined in claim 36, wherein the mixed gas channels are provided with a plurality of fins.

41. A fuel reforming apparatus as defined in claim 34, wherein the vaporization means includes mixed gas heating means for heating the mixed gas.

42. A fuel reforming apparatus for reforming hydrocarbon-based fuel into hydrogen-rich fuel gas, comprising:
   a reforming reactor for generating a reformed gas containing hydrogen and carbon monoxide from the hydrocarbon-based fuel;
   a water gas shift reactor for reducing concentration of carbon monoxide in the reformed gas by promoting a shift reaction for generating hydrogen and carbon dioxide from carbon monoxide and steam;
   a water feeding unit for feeding water for use in the shift reaction into a flow path of the reformed gas; and
   a heat exchanger for cooling the reformed gas prior to completion of the shift reaction by exchanging heat with a coolant including water to be used in the shift reaction,
   wherein the water feeding unit vaporizes the water to be used in the shift reaction that has been heated in the heat exchanger, thereby feeding the water into the flow path of the reformed gas.

43. A fuel reforming apparatus as defined in claim 42, wherein the heat exchanger cools the reformed gas before feeding the reformed gas to the water gas shift reactor.

44. A fuel reforming apparatus as defined in claim 42, wherein the water gas shift reactor includes a high-temperature water gas shift reactor for promoting the shift reaction at a relatively high temperature, and a low-temperature water gas shift reactor disposed downstream from the high-temperature water gas shift reactor and designed to promote the shift reaction at a relatively low temperature; and
   the heat exchanger cools the reformed gas discharged by the high-temperature water gas shift reactor before feeding the reformed gas to the low-temperature water gas shift reactor.

45. A fuel reforming apparatus as defined in claim 44, wherein the water feeding unit supplies the low-temperature water gas shift reactor with the water to be used in the shift reaction that has been heated by heat exchange in the heat exchanger.

46. A fuel reforming apparatus as defined in claim 42, wherein the coolant of the heat exchanger further includes another coolant other than the water to be used in the shift reaction; and
   the heat exchanger includes:
      a reformed gas channel for passing the reformed gas;
      a first coolant channel for passing said another coolant; and a second coolant channel for passing the water to be used in the shift reaction, the second coolant channel being configured such that the water to be used in the shift reaction exchanges heat with the reformed gas passing through the reformed gas channel.

47. A fuel reforming apparatus as defined in claim 46, wherein the reformed gas channel and the first channel are configured substantially orthogonal to each other.

48. A fuel reforming apparatus as defined in claim 46, wherein the second coolant channel is disposed along the reformed gas channel at a peripheral region around the reformed gas channel.

49. A fuel reforming apparatus as defined in claim 48, wherein the water feeding unit includes a porous body connected both to the second coolant channel and to at least part of the reformed gas channel at the peripheral region around the reformed gas channel, whereby the water to be used in the shift reaction is vaporized into the reformed gas channel from the porous body.

50. A fuel reforming apparatus as defined in claim 49, the water to be used in the shift reaction flows into the porous body from the second coolant channel in a direction opposite to a flow direction of the reformed gas in the reformed gas channel.

51. A fuel reforming apparatus as defined in claim 42, wherein the water feeding unit includes a porous body connected to the flow path of the reformed gas at a prescribed location between an outlet of the reforming reactor and an outlet of the water gas shift reactor, the porous body being supplied with heated water to be used in the shift reaction via the heat exchanger, whereby the water to be used in the shift reaction is vaporized into the flow path of the reformed gas from the porous body.

52. A fuel reforming apparatus for reforming hydrocarbon-based fuel into hydrogen-rich fuel gas, comprising:
a reforming reactor for reforming the hydrocarbon-based fuel into a reformed gas containing hydrogen and carbon monoxide;
a water gas shift reactor for converting steam and carbon monoxide into hydrogen and carbon dioxide;
a connector for connecting the reforming reactor and the water gas shift reactor to allow the reformed gas from the reforming reactor to be fed to the water gas shift reactor, the connector including a reformed gas permeable member disposed proximate to the reforming reactor, the reformed gas permeable member having a plurality of gaps capable of passing the reformed gas from the reforming reactor; and
liquid water feeding means for feeding liquid water to the reformed gas permeable member.

53. A fuel reforming apparatus as defined in claim 52, wherein the reformed gas permeable member includes a plurality of gas introduction ports capable of introducing the reformed gas supplied from the reforming reactor into the reformed gas permeable member.

54. A fuel reforming apparatus as defined in claim 52, wherein the reformed gas permeable member includes a plurality of gas discharge ports disposed proximate to the water gas shift reactor for discharging the reformed gas supplied from the reforming reactor toward the water gas shift reactor.

55. A fuel reforming apparatus as defined in claim 52, wherein the liquid water feeding means includes a water feeding pipe formed inside the reformed gas permeable member.

56. A fuel reforming apparatus as defined in claim 55, wherein the water feeding pipe is formed proximate to the reforming reactor.

57. A fuel reforming apparatus as defined in claim 55, wherein the water feeding pipe has a plurality of feed ports for feeding the liquid water into the reformed gas permeable member against a flow of the reformed gas.

58. A fuel reforming apparatus as defined in claim 52, wherein the connector includes a gas-mixing space at an outlet of the reformed gas permeable member.

59. A fuel reforming apparatus as defined in claim 58, wherein the connector includes gas-uniformalizing means, disposed at a downstream side of the gas-mixing space, for promoting uniformity of gas mixture and gas flow.

60. A fuel reforming apparatus as defined in claim 59, wherein the gas-uniformalizing means includes a member having a plurality of gaps for passing gas responsive to a prescribed pressure difference.

61. A fuel reforming apparatus for reforming hydrocarbon-based fuel into hydrogen-rich fuel gas, comprising:
a reforming reactor for reforming the hydrocarbon-based fuel into a reformed gas containing hydrogen and carbon monoxide;
a water gas shift reactor for converting steam and carbon monoxide into hydrogen and carbon dioxide;
a connector for connecting the reforming reactor and the water gas shift reactor to allow the reformed gas from the reforming reactor to be fed to the water gas shift reactor, the connector including a reformed gas permeable member disposed proximate to the reforming reactor, the reformed gas permeable member having a plurality of capillaries; and
liquid water feeding means for feeding liquid water to the plurality of capillaries of the reformed gas permeable member.

62. A fuel reforming apparatus as defined in claim 61, wherein each capillary has an inner surface and a plurality of nucleators on the inner surface for forming boiling nuclei for the liquid water.

63. A fuel reforming apparatus as defined in claim 62, wherein at least part of the inner surfaces of the plurality of capillaries proximate to the water gas shift reactor are treated by one of hydrophilical treatment and hygroscopical treatment.

64. A fuel reforming apparatus as defined in claim 61, further comprising stopper members, composed of a gas-permeable material, for plugging the plurality of capillaries on a side proximate to the water gas shift reactor.

65. A fuel reforming apparatus as defined in claim 61, wherein the connector includes a gas-mixing space at an outlet of the reformed gas permeable member.

66. A fuel reforming apparatus as defined in claim 65, wherein the connector includes gas-uniformalizing means, disposed at a downstream side of the gas-mixing space, for promoting uniformity of gas mixture and gas flow.

67. A fuel reforming apparatus as defined in claim 66, wherein the gas-uniformalizing means includes a member having a plurality of gaps for passing gas responsive to a prescribed pressure difference.

* * * * *